(12) United States Patent
Takeuchi

(10) Patent No.: US 10,073,493 B2
(45) Date of Patent: Sep. 11, 2018

(54) DEVICE AND METHOD FOR CONTROLLING A DISPLAY PANEL

(71) Applicant: Sony Corporation, Tokyo (JP)

(72) Inventor: Takuma Takeuchi, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 444 days.

(21) Appl. No.: 14/219,053

(22) Filed: Mar. 19, 2014

(65) Prior Publication Data

US 2015/0268743 A1   Sep. 24, 2015

(51) Int. Cl.
*G06F 1/16* (2006.01)
*G06F 3/0482* (2013.01)
*G06F 3/0488* (2013.01)

(52) U.S. Cl.
CPC .......... *G06F 1/1681* (2013.01); *G06F 1/1632* (2013.01); *G06F 3/0482* (2013.01); *G06F 3/04886* (2013.01)

(58) Field of Classification Search
CPC .. G06F 3/04886; G06F 3/0482; G06F 1/1681; G06F 1/1632; G06F 3/0412; G06F 2203/04104; G06F 3/03547
See application file for complete search history.

(56) References Cited

U.S. PATENT DOCUMENTS

| 6,560,612 B1 | 5/2003 | Yamada et al. |
| 2007/0139386 A1* | 6/2007 | Martin ................ G06F 3/04886 345/173 |
| 2010/0259561 A1* | 10/2010 | Forutanpour ......... G06F 3/0216 345/660 |
| 2012/0044164 A1 | 2/2012 | Kim et al. |
| 2012/0178507 A1 | 7/2012 | Lee |

(Continued)

FOREIGN PATENT DOCUMENTS

| EP | 2 482 175 A1 | 8/2012 |
| JP | 2005-128802 A | 5/2005 |
| WO | WO 2013/018480 A1 | 2/2013 |

OTHER PUBLICATIONS

Extended European Search Report dated Nov. 17, 2015 in Patent Application No. 14190502.6.

(Continued)

*Primary Examiner* — Abhishek Sarma
(74) *Attorney, Agent, or Firm* — Xsensus, LLP

(57) ABSTRACT

A device including circuitry that receives a first input from one or more touch sensors included in a display panel, and determines, based on the first input, whether a first touch operation is performed within a predetermined portion of the display panel. The circuitry controls, when it is determined that the first touch operation was performed within the predetermined portion, the display panel to display a screen pad and a pointer within an interface. The circuitry determines, based on a second input received from the one or more touch sensors, whether a second touch operation is performed within a portion of the display panel corresponding to the displayed screen pad. The circuitry controls, when the second touch operation is performed within the screen pad and based on features of the second touch operation, at least one of a movement of the pointer and an operation of the device.

16 Claims, 12 Drawing Sheets

(56) References Cited

U.S. PATENT DOCUMENTS

| | | |
|---|---|---|
| 2012/0182296 A1 | 7/2012 | Han |
| 2013/0067397 A1 | 3/2013 | Kirschner et al. |
| 2013/0219338 A1* | 8/2013 | VanBlon ............... G06F 3/0488 715/815 |
| 2013/0322011 A1 | 12/2013 | Yeh |
| 2014/0160073 A1 | 6/2014 | Matsuki |
| 2015/0324087 A1* | 11/2015 | Gregory ............... G06F 3/0488 345/174 |

OTHER PUBLICATIONS

Extended European Search Report dated Aug. 22, 2014 in Patent Application No. 14167679.1.

* cited by examiner

DEVICE AND METHOD FOR CONTROLLING A DISPLAY PANEL

BACKGROUND

Technical Field

The present disclosure relates to the control of a display panel based on detected input operations on a display interface.

Description of Related Art

Terminal devices such as smartphones and tablet devices may include a touch panel display screen such that a user may perform touch operations on a displayed interface. For example, the user may touch the operating surface of the touch panel screen with his/her finger to perform an input operation.

In recent years, in an effort to provide more information to the user, display screens in terminal devices have grown larger in size. For example, smart phones are growing increasingly larger in size and tablet devices are more prevalent. However, the increasing screen size causes difficulty when a user wishes to perform a touch operation using a single hand (i.e., the hand holding the terminal device). In particular, a touch operation using a finger on a single hand that is holding a tablet or other large terminal device becomes difficult because the user's fingers cannot reach all areas of the touch panel display surface. For example, a user holding a bottom right corner of the terminal device cannot reach the upper left corner of the device in order to perform a touch operation. As a result, users are precluded from performing single-handed touch operations on terminal devices with large touch panel display screens, thereby requiring the user to operate the touch panel device using both hands and/or requiring the user to place the terminal device on a resting surface such as a table while performing the touch operation.

Personal computing devices such as laptops may include a physical touch pad on which a user may perform input operations. For example, sensors on the physical touch pad may detect a relative position of the user's finger and control a pointer on a main display screen that is separate from the touch pad. However, the arrangement of a separate physical touch pad and a main display screen is undesirable and impractical for terminal devices that include touch screens for performing input operations.

SUMMARY

In light of the above, it is desirable to provide an improved device and method for controlling a display panel based on touch operations.

In one or more embodiments according to the present disclosure, a device includes circuitry configured to receive a first input from one or more touch sensors included in a display panel. The circuitry determines, based on the first input from the one or more touch sensors, whether a first touch operation is performed within a predetermined portion of the display panel. The circuitry controls, when it is determined that the first touch operation was performed within the predetermined portion of the display panel, the display panel to display a screen pad and a pointer within an interface on the display panel. The circuitry determines, based on a second input received from the one or more touch sensors, whether a second touch operation is performed within a portion of the display panel corresponding to the displayed screen pad. The circuitry controls, when the second touch operation is performed within the screen pad and based on features of the second touch operation, at least one of a movement of the pointer and an operation of the device.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
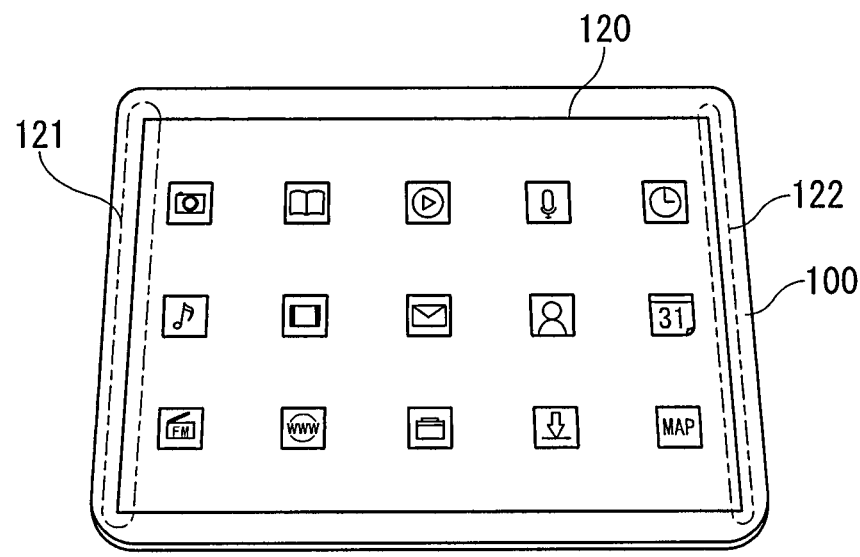
FIG. 1 illustrates a non-limiting example of providing a screen pad within an interface displayed on a display panel, according to certain embodiments.
Figure 1:
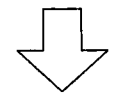
Figure 1:
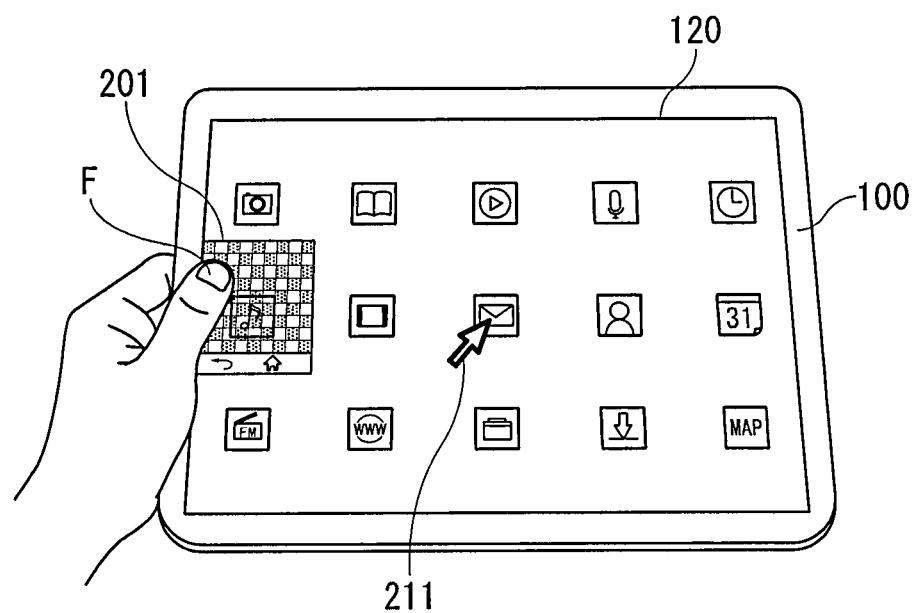

Referring now to the drawings, wherein like reference numerals designate identical or corresponding parts throughout the several views.

FIG. 1 illustrates a non-limiting example providing a screen pad within an interface displayed on a display panel, according to certain embodiments. In the example of FIG. 1, a terminal device 100 is implemented as a tablet-type device that includes a display 120. The display 120 may include one or more touch sensors configured to detect a touch operation on an operating surface of the display 120. For example, the one or more touch sensors included within the display 120 may detect when an instruction object such a user's finger or a stylus-type object comes within a predetermined distance of the operating surface of the display 120.

In one or more embodiments, the display 120 may output a graphical user interface including a plurality of icons. However, a user holding the terminal device 100 with his or her hand on either an edge portion 121 or an edge portion 122 cannot physically reach an icon on the opposing edge of the terminal device 100 with the hand that is holding the device. For example, a user holding the terminal device 100 with his or her left hand along the edge portion 121 cannot touch an icon displayed at the top right corner of the terminal device 100 illustrated at the top of FIG. 1.

In light of the above problem, processing according to the present disclosure may allow a user to perform an input operation with respect to any area of the display 120 while continually holding the terminal device 100 with a single hand. For example, in one or more embodiments, control processing in accordance with the present disclosure may allow for controlling the display 120 such that a screen pad is displayed within an interface on the display in response to detecting a touch operation within a predetermined portion of the display 120. Referring to the top of FIG. 1, the predetermined portion of the display 120 may, in certain implementations, correspond to an edge of the display 120. In the example of FIG. 1, the edge portion 121 and the edge portion 122 may be utilized as the predetermined portions of the display 120 that would cause a screen pad to be displayed within the interface in response to detecting a touch operation within these portions of the screen. It is noted that the dotted lines illustrated with respect to the edge portion 121 and 122 are merely for illustration purposes and these lines do not actually appear on the device and/or the screen. Further, the skilled artisan will appreciate that any arbitrary portion of the display 120 may be utilized for controlling the display 120 such that a screen pad is displayed within the interface, and the present disclosure is not limited to performing such control features in response to a touch operation detected on an edge of the display 120.

Referring now to the bottom of FIG. 1, supposing a touch operation is detected within an area corresponding to the edge portion 121 on the display 120, control circuitry within the terminal device 100 may control the display 120 such that a screen pad 201 is displayed within an interface on the display 120 in a vicinity to the position at which the touch operation is detected. For example, the user may contact the operating surface of the display 120 with his or her finger F and, in response to the detected touch operation from the one or more touch sensors in the display 120, the screen pad 201 may be displayed on the display 120 within a predetermined distance of the left edge of the terminal device 100. Moreover, in certain implementations, a pointer 211 may also be displayed in response to detecting the touch operation within the portion of the display 120 corresponding to the edge portion 121. The pointer 211 is displayed substantially in the center of an interface displayed on the display 120 in this example. However, the pointer 211 may be initially displayed in any arbitrary portion on the display 120. Similarly, the screen pad 201 is not limited to being displayed along an edge of the display 120 in response to detecting the touch operation along a corresponding edge of the display 120, and any arbitrary display position of the screen pad 201 may be utilized. However, displaying the screen pad 201 at or near a position corresponding to the detected touch operation provides the benefit of enabling single-hand operation of the device without the need to adjust the hand position.

By providing the screen pad 201 within the interface on the display 120, the user is now permitted to perform input operations on the terminal device 100 using his or her finger F. For example, the user may control a movement of the pointer 211 by moving the finger F in the area corresponding to the screen pad 201. In this case, the movement of the pointer 211 may move in relation to a trace of the user's finger as the touch operation is performed within the screen pad 201.

In one or more embodiments, instructions for executing an operation or application on the terminal device 100 may be performed in response to detecting features of a touch operation performed in an area corresponding to the screen pad 201. For example, in response to detecting a tap operation within an area corresponding to the screen pad 201, an icon at a corresponding location of the pointer 211 within the interface displayed on the display 120 may be selected and instructions for executing the application corresponding to the selected icon may be executed. In one or more embodiments, when the position within the area corresponding to the screen pad 201 does not correspond to an area of the interface at which instructions for an operation would be executed in response to the tap (or other touch) operation, the pointer 211 may instead be moved to that position. In still further embodiments, a combination of executing the instructions corresponding to the operation and moving the pointer to a position of the interface on display 210 corresponding to the detected position within the screen pad 201 at which the touch operation is performed may also be applied.

Furthermore, in certain embodiments, a touch operation detected within an area corresponding to the screen pad 201 may correspond to an operation for changing one or more of a display size where a display position of the interface or an element within the interface displayed on the display 120. For example, a swipe or flick operation may be detected within an area corresponding to the screen pad 201 and in response to the detected swipe or flick operation, control circuitry within the terminal device 100 may control a display 120 such that the interface displayed on the display 120 is moved in a direction and magnitude corresponding to the features of the swipe or flick operation.

As another example, a pinch operation may be detected within an area corresponding to the screen pad 201. In certain embodiments, in response to detecting the pinch operation, control circuitry within the terminal device 100 may control a display 120 such that the interface or an element within the interface displayed on the display 120 is changed in size in a magnitude and direction corresponding to the features of the pinch operation. Further exemplary processing related to detecting touch operations within an area corresponding to the screen pad 201 will be described in detail throughout the present disclosure.

In certain embodiments, following the display of the screen pad 201 within the interface on the display 120, control circuitry included within the terminal device 100 may suppress displaying the screen pad 201 in response to detecting a touch operation in an area outside of the boundary of the screen pad 201. For example, after initially displaying the screen pad 201 on the display 120 in response to detecting a touch operation within the edge portion 121, a subsequent touch operation may be performed in an area corresponding to the right edge portion 122 (or any arbitrary point outside the edge portion 121). In response to the subsequent touch operation, the control circuitry of the terminal device 100 may discontinue the display of the screen pad 201 within the interface (i.e. the display is restored to the condition displayed at the top of FIG. 1, or some other arbitrary condition that does not include the screen pad 201). Suppressing the display of the screen pad 201 in this example provides the user with a full screen on the display 120 with which to operate the device and/or consume content on the device (e.g. watching a video on the full screen of the display 120). However, it is not necessary that the screen pad be suppressed and, in certain implementations, a screen pad such as the screen pad 201 may be provided in one or more locations of the display 120 for continuous display within an interface. Moreover, in certain embodiments, screen pad 201 may not necessarily be graphically represented within the interface of the display 120 and instead, a predetermined portion of the display 120 may be utilized for performing the display control processing described herein without the explicit graphical representation of the screen pad on the display 120. Further, the graphical representation of the screen pad 201 provided herein is not limiting, and other representations of screen pads may be utilized by variations in color, size, pattern, dimensions, transparency, included icons, etc.

Figure 2:
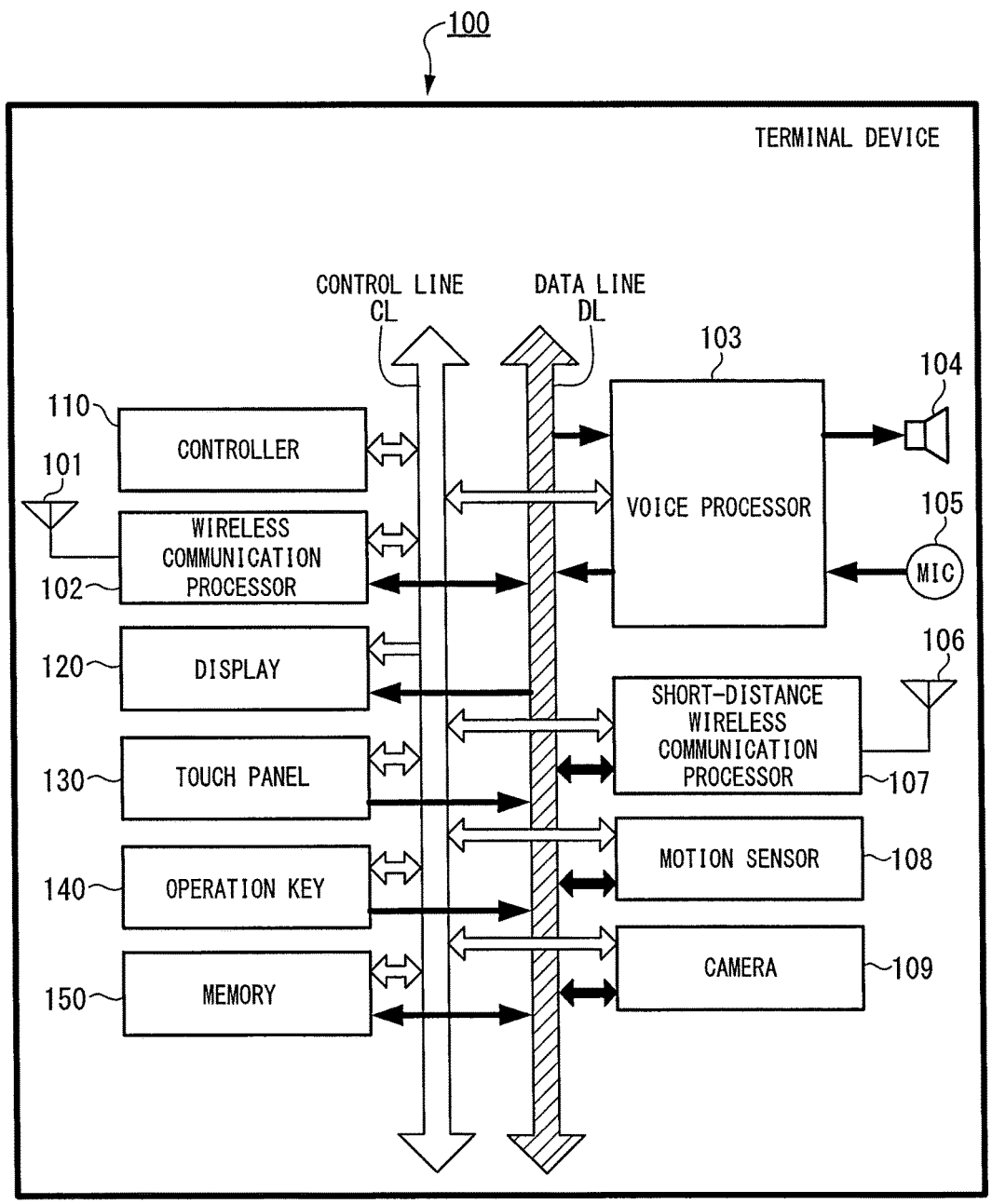
FIG. 2 illustrates a non-limiting exemplary structural block diagram for a terminal device, according to certain embodiments.

Next, FIG. 2 illustrates a block diagram for an exemplary terminal device, according to certain embodiments of the present disclosure. For simplicity, the terminal device illustrated in FIG. 2 is implemented as a mobile phone terminal device in examples described herein. However, the skilled artisan will appreciate that the processing described herein may be easily adapted for other types of devices (e.g. a desktop computer, a tablet device, a laptop computer, a server, an e-reader device, a camera, a portable gaming device, a navigation unit, etc.).

Referring now to FIG. 2, the exemplary terminal device 100 of FIG. 2 includes a controller 110, a wireless communication processor 102 connected to an antenna 101, a voice processor 103, a speaker 104, a microphone 105, a short-distance wireless communication processor 107 connected to an antenna 106, a motion sensor 108, a camera 109, a display 120, a touch panel 130, an operation key 140, and a memory 150.

The antenna 101 transmits/receives electromagnetic wave signals between base stations for performing radio-based communication, such as the various forms of cellular telephone communication.

The wireless communication processor 102 controls communications performed between the terminal device 100 and other external devices via the antenna 101. For example, the wireless communication processor 102 may control communication between base stations for cellular telephone communication.

The voice processor 103 demodulates and/or decodes the audio data read from the memory 150, or audio data received by the wireless communication processor 102 and/or short-distance wireless communication processor 107. Additionally, the voice processor 103 may decode audio signals received from the microphone 105.

The speaker 104 emits an audio signal corresponding to audio data supplied from the voice processor 103.

The microphone 105 detects surrounding audio, and converts the detected audio into an audio signal. The audio signal may then be output to the voice processor 103 and/or the controller 110 for further processing.

The antenna 106 may transmit/receive electromagnetic wave signals to/from other external apparatuses, and the short-distance wireless communication processor 107 may control the wireless communication performed with the other external apparatuses. Bluetooth, IEEE 802.11, and near field communication (NFC) are non-limiting examples of wireless communication protocols that may be used for inter-device communication via the short-distance wireless communication processor 107.

The motion sensor 108 may include one or more motion sensors capable of determining various aspects of motion with respect to the terminal device 100. For example, the sensor 108 may include one or more gyroscopes, accelerometers, or the like. In certain embodiments, the controller 110 may determine an orientation of the terminal device 100 based on motion sensor inputs received from the motion sensor 108. The orientation of the terminal device 100 may be represented in one or more embodiments as a tilt angle of the terminal device 100 with respect to one or more axes (e.g., the x/y/z axis). In one or more embodiments, the orientation of the terminal device 100 may include an indication of whether the terminal device 100 is held in a landscape or portrait orientation.

Image data may be generated by the terminal device 100 via the camera 109, which may include one or more image sensors comprised of, e.g., a charged couple device (CCD), complementary metal oxide semiconductor (CMOS), or the like. For example, an image signal may be generated by the camera 109 when an image formed on a light-receiving surface through a lens is photoelectrically converted. The lens of the camera 109 may, for example, be arranged on a front end or back surface of the terminal device 100 when implemented as a mobile phone device or smart phone. The camera 109 may, in one or more embodiments, include one or more processing circuits for performing processing features with respect to still and/or moving image data.

The controller 110 may include one or more central processing units (CPUs), and may control each element in the terminal device 100 to perform features related to communication control, audio signal processing, control for the audio signal processing, image processing and control, and other kinds of signal processing. The controller 110 may perform these features by executing instructions stored in the memory 150. Alternatively or in addition to the local storage of the memory 150, the features may be executed using instructions stored in an external device accessed on a network or on a non-transitory computer readable medium.

The display 120 may be a liquid crystal display (LCD), an organic electroluminescence display panel, or another display screen technology. In addition to displaying still and moving image data, the display 120 may display operational inputs, such as numbers or icons, which may be used for control of the terminal device 100. The display 120 may additionally display a graphical user interface with which a user may control aspects of the terminal device 100. Further, the display 120 may display characters and images received by the terminal device 100 and/or stored in the memory 150 or accessed from an external device on a network. For example, the terminal device 100 may access a network such as the Internet and display text and/or images transmitted from a Web server.

The touch panel 130 may include a physical touch panel display screen and a touch panel driver. The touch panel 130 may include one or more touch sensors for detecting an input operation on an operating surface of the touch panel display screen. Used herein, the phrasing "touch operation" refers to an input operation performed by touching an operating surface of the touch panel display with an instruction object, such as a finger or stylus-type instrument. In the case where a stylus, or the like, is used in a touch operation, the stylus may include a conductive material at least at the tip of the stylus such that the sensors included in the touch panel 130 may detect when the stylus approaches/contacts the operating surface of the touch panel display (similar to the case in which a finger is used for the touch operation).

In one or more embodiments, the touch panel 130 may be disposed adjacent to the display 120 (e.g., laminated), or may be formed integrally with the display 120. The display 120 and the touch panel 130 may be surrounded by a protective casing, which may also enclose the other elements included in the terminal device 100. For simplicity, exemplary embodiments described herein assume that the touch panel 130 is formed integrally with the display 120 and therefore, the examples may describe touch operations being performed with respect to the display 120.

In one or more embodiments, the touch panel 130 is a capacitance-type touch panel technology. In other embodiments, the touch panel 130 may be implemented using other touch panel types with alternative structures, such as resistance-type touch panels. In certain embodiments, the touch panel 130 may include transparent electrode touch sensors arranged in the x/y direction on the surface of transparent sensor glass.

The touch panel driver may be included in the touch panel 130 for control processing related to the touch panel 130, such as scanning control. For example, the touch panel driver may scan each sensor in an electrostatic capacitance transparent electrode pattern in the x-direction and the y-direction and detect the electrostatic capacitance value of each sensor to determine when a touch operation is performed. The touch panel driver may output a coordinate and corresponding electrostatic capacitance value for each sensor. The touch panel driver may also output a sensor identifier that may be mapped to a coordinate on the touch panel display screen. Additionally, the touch panel driver and touch panel sensors may detect when an instruction object is within a predetermined distance from the operating surface of the touch panel display screen. That is, an electrostatic capacitance above a given background level may be detected when an instruction object is near, but not necessarily touching, the operating surface of the touch panel 130. Accordingly, the controller 110 may determine that a touch operation has occurred in response to detecting an electrostatic capacitance above a predetermined threshold, wherein the threshold magnitude corresponds to a condition when the instruction object is within a predetermined distance from the operating surface of the touch panel.

The operation key 140 may include one or more buttons similar to external control elements (e.g., power control, volume control, standby control, etc.). The operation key 140 may generate an operation signal based on a detected input. The operation signals generated by the operation key 140 may be supplied to the controller 110 for performing related processing control of the terminal device 100. In certain aspects of the present disclosure, the processing and/or functions associated with external buttons and the like may be performed by the controller 110 in response to an input operation on the touch panel 130 in lieu of implementing the terminal device with external buttons in the operation key 140.

The terminal device 100 includes a control line CL and a data line DL as internal communication bus lines. Control data to/from the controller 110 may be transmitted through the control line CL. The data line DL may be used for transmission of voice data, display data, etc.

Figure 3:
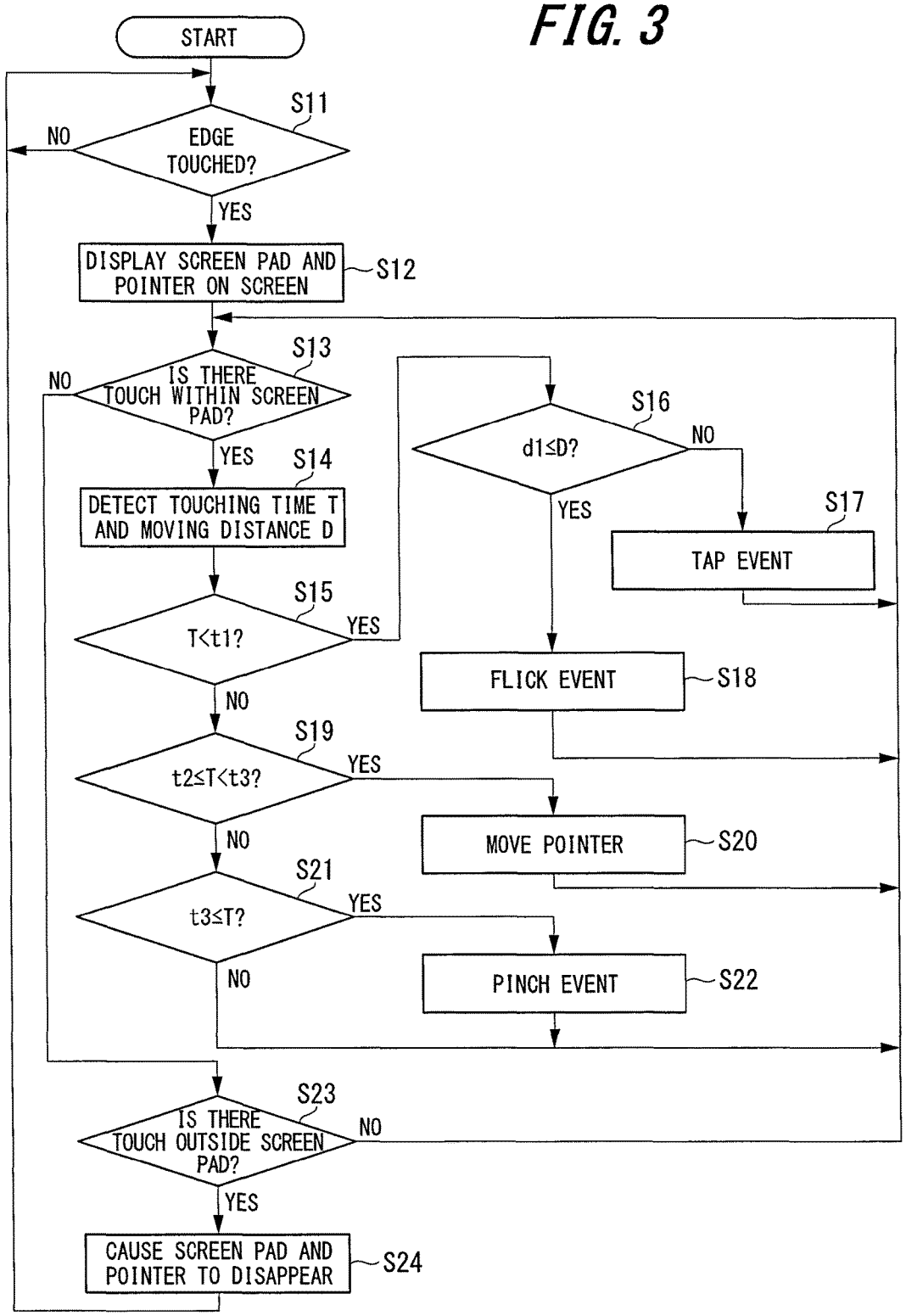
FIG. 3 illustrates a non-limiting exemplary flowchart for controlling a display panel based on touch operations detected in a screen pad included in a display interface, according to certain embodiments.

Next, FIG. 3 illustrates a non-limiting exemplary flowchart for controlling a display panel based on touch operations detected in an area corresponding to a screen pad included in a display interface, according to certain embodiments.

At step S11, the controller 110 determines whether a touch operation has occurred within a predetermined portion of the touch panel 130, wherein the predetermined portion of the touch panel corresponds to an area that would cause the screen pad 201 to be displayed within the interface on the display 120. For the purposes of the examples described herein, the predetermined portion of the touch panel 130 corresponds to an edge of the display 120. In this example, the controller 110 may determine that the touch operation occurs when the one or more touch sensors in the touch panel 130 detect an instruction object within a predetermined distance of the operating surface of the touch panel and within a suitable predetermined range of the edge of the display 120. For example, the controller 110 may determine when a touch operation is detected within edge portions 121 or 122 from FIG. 1. If a touch operation is not detected within the edge portion at step S11, the controller 110 continues monitoring for the touch operation within the edge portion.

Otherwise, at step S12 the controller 110 controls the display 120 such that the screen pad 201 and the pointer 211 are displayed within an interface on the display 120. In one or more embodiments, the controller 110 controls the display 120 such that the screen pad 201 is displayed within the interface at a position corresponding to a position on the display panel 120 at which the touch operation is detected to have occurred. In other embodiments, the screen pad 201 may be displayed at any arbitrary position within the display 120 in response to detecting the touch operation within the edge portion. By way of non-limiting example, in response to detecting a touch operation at approximately a center position within the edge portion 121, the controller 110 controls the display 120 such that the screen pad 201 is displayed within an interface on the display 120 at a position corresponding to an approximate center of the left edge of the display 120. Additionally, in response to detecting the touch operation performed in the edge portion 121, the controller 110 controls the display 120 such that the pointer 211 is displayed in the approximate center position of the interface within the display 120.

Referring back to FIG. 3, at step S13, the controller 110 determines whether a touch operation occurs within an area corresponding to the displayed screen pad 201. If a touch operation is not detected within an area corresponding to the screen pad 201, the processing moves to step S23.

Otherwise, if the controller 110 at step S13 determines that a touch operation occurs within an area corresponding to the screen pad 201, the controller 110 at step S14 determines a touching time (T) and a moving distance (D) corresponding to the touch operation. The time T indicates a duration of the touch operation (e.g., the timeframe from an initial detection of the instruction object contacting the operating surface to a time at which the instruction object leaves the operating surface of the touch panel) and the moving distance D indicates a length of the trace of the instruction object while performing the touch operation.

At step S15, the controller 110 determines whether the time T is less than a predetermined time t1. In one or more embodiments, the predetermined time t1 corresponds to a suitable time for distinguishing between touch operations typically occurring within a short time period and those touch operations that typically occur over longer time periods. For example, a touch operation that typically occurs over a short time period may be a tap operation or a flick/swipe operation. Further, an example of a touch operation that typically occurs over relatively longer time periods is a pinch operation. In one or more embodiments, the time t1 may be selected as a relatively short time period such as approximately 100 milliseconds.

If the time T is determined to be greater than time t1 at step S15, the processing to step S19.

Otherwise, the controller 110 at step S16 determines whether the moving distance D is greater than or equal to a predetermined distance d1. In one or more embodiments, the distance d1 may be selected as a suitable distance for distinguishing between a tap event and a flick event. For example, the distance d1 may be set as a relatively short distance such as 2-3 millimeters. If the controller 110 determines at step S16 that the moving distance D is greater than or equal to the distance d1, the controller 110 at step S17 performs processing related to a tap event. In one or more embodiments, the processing related to the tap event may include an operation for executing instructions based on a current displayed position of the pointer 211. For example, if the display position of the pointer 211 corresponds to an icon displayed within an interface on the display 120, the controller 110 may execute the operation associated with the icon at step S17 (similar to a clicking operation performed with a mouse on a desktop computer).

If the controller 110 determines at step S16 that moving distance D is less than the distance d1, the controller 110 at step S18 performs processing corresponding to a flick event. In a non-limiting example of processing performed in response to detecting a flick event at step S18, the controller 110 may control the display 120 such that an element within an interface or the entire interface itself is moved in a direction of magnitude corresponding to the features of the flick event. For example, an interface displayed in the display 120 may be moved to the right within the display 120 in response to detecting a flick operation in which the instruction object moves to the right. Further, the distance that the interface is moved to the right in this example may be proportional to the moving distance D during the flick operation. Additional exemplary processing that may be performed for a flick event at step S18 will be discussed in further detail at least with respect to FIGS. 6 and 7.

After executing the processing related to the tap event or the flick event at steps S17 and S18, respectively, the process of FIG. 3 returns to the determination at step S13.

Referring back to the determination performed at step S15, if the controller 110 determines at step S15 that the time T is less than the time t1, the controller 110 then determines at step S19 whether the time T is greater than or equal to another predetermined time t2 but less than or equal to a third predetermined time t3. In one or more embodiments, the times t2 and t3 may be selected as suitable times for distinguishing between processing related to moving the pointer 211 and processing relating to a pinch event. For example, t2 may be selected as approximately 200 milliseconds and time t3 may be selected as approximately 1200 milliseconds.

If the controller 110 determines at step S19 that the time T is between times t2 and t3, the controller 110 at step S20 performs processing related to moving the displayed pointer within the interface on the display 120. In one or more embodiments, the pointer 211 is moved within the interface on the display 120 in relation to the trace formed by the instruction object while performing the touch operation. Further exemplary processing relating to moving a pointer within a displayed interface will be discussed in detail at least with respect to FIG. 8.

If the controller 110 determines at step S19 that the time T is not between the times t2 and t3, the process of FIG. 3 progresses to step S21 where the controller 110 determines whether the time T is greater than or equal to the time t3. If the controller 110 determines at step S21 that the time T is greater than or equal to the time t3, the controller 110 at step S22 performs processing related to a pinch event. In one or more embodiments, the processing related to the pinch event performed at step S22 may include controlling the display 120 such that an interface or an element within the interface is increased or decreased in size within the display 120. Further exemplary processing related to the pinch event will be discussed in detail at least with respect to FIG. 4.

Upon completion of the processing at either step S20 or step S22, the process of FIG. 3 returns to the determination at step S13.

Referring back to the determination performed at step S13, if the controller 110 determines at step S13 that a touch operation has not been detected within an area corresponding to the screen pad 201, the controller 110 at step S23 determines whether a touch operation is detected in an area outside of the area corresponding to the screen pad 201. For example, the controller 110 at step S23 may determine whether a touch operation is detected outside of the area bounded by the screen pad 201 illustrated in FIG. 1, such as an icon along the right edge of the display 120.

If the controller 110 at step S23 determines that a touch operation has not been performed in an area outside the area corresponding to the screen pad 201, the process of FIG. 3 returns to the determination at step S13 where the controller 110 continues monitoring for a touch operation within an area corresponding to the screen pad 201.

Otherwise, if the controller 110 at step S23 determines that a touch operation has occurred in an area outside the area corresponding to the screen pad 201, the controller 110 at step S24 causes the screen pad 201 and the pointer 211 to disappear from the interface on the display 120. Following the suppression of the screen pad 201 and the pointer 211 from the interface, the process of FIG. 3 returns to step S11, where the controller 110 monitors for a touch operation detected in an edge portion of the touch panel 130.

Figure 4:
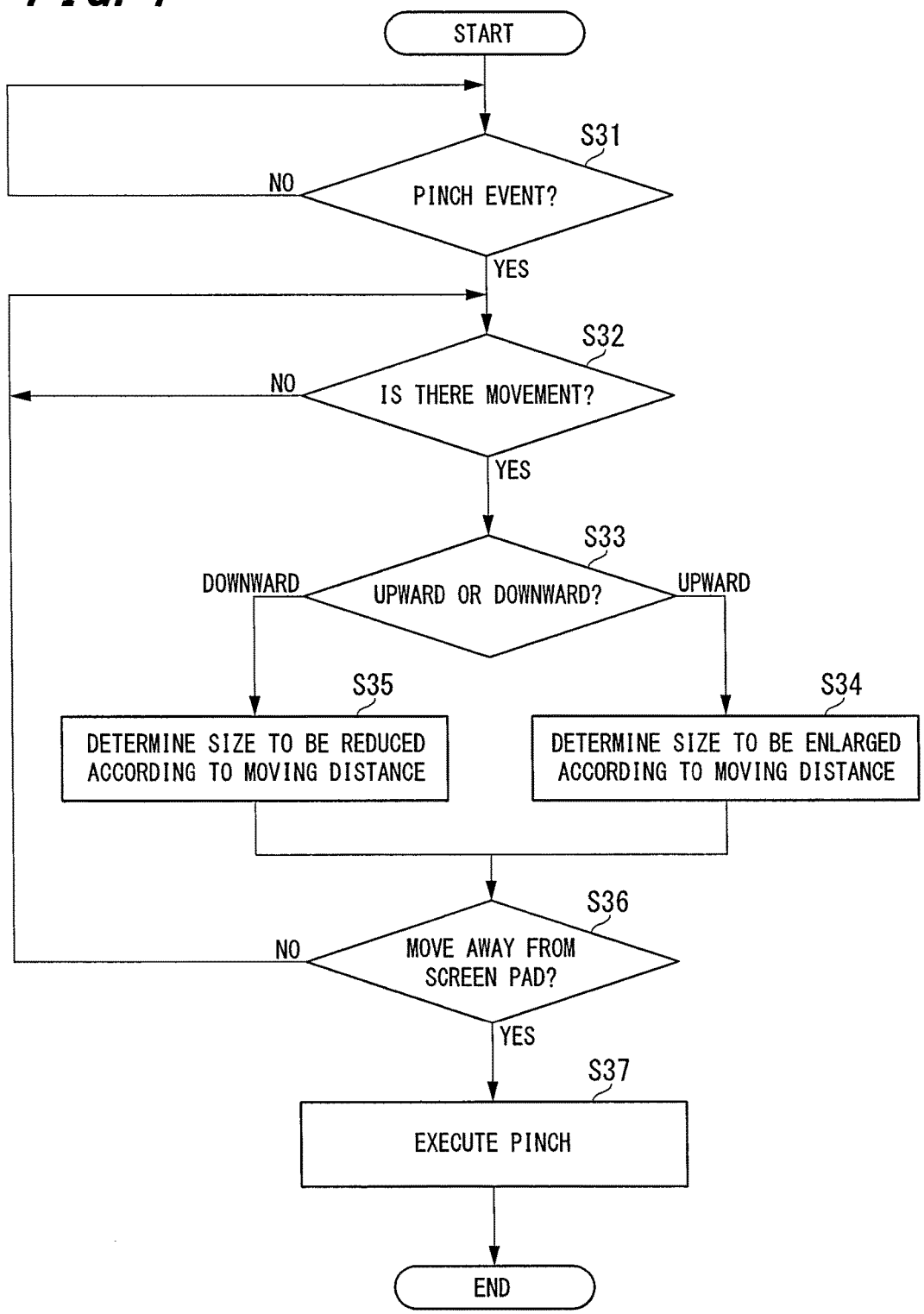
FIG. 4 illustrates a non-limiting exemplary flowchart for controlling a display panel based on a pinch operation detected in a screen pad included in a display interface, according to certain embodiments.

Next, FIG. 4 illustrates a non-limiting exemplary flowchart for controlling a display panel based on a pinch operation detected in a screen pad included in a display interface, according to certain embodiments. It is initially noted that while the example of FIG. 4 describes processing performed in response to detecting a pinch operation, the processing described in this example may be adapted such that it is performed in response to detecting other types of touch operations. For example, the processing illustrated and described with respect to FIG. 4 may correspond to processing performed in response to detecting any arbitrary touch operation within a screen pad displayed in an interface on the display 120.

It should be noted that for the purposes of the present disclosure a "pinch event" does not necessarily require a user performing the touch operation with two fingers. That is, while a pinch event in certain implementations may correspond to a user moving two fingers closer together or farther apart, in certain embodiments of the present disclosure, in order to accommodate a user performing input operations with a single hand, the pinch event may correspond to motion using only a single finger or a single stylus, etc.

Referring now to FIG. 4, at step S31, the controller 110 determines whether a pinch event has been detected in an area corresponding to the screen pad 201 on the display 120.

For example, the processing of step S31 may correspond to the pinch event generated at step S22 of FIG. 3. If a pinch event is not detected at step S31, the controller 110 continues monitoring for the pinch event.

Otherwise, at step S32, the controller 110 determines whether there is movement of an instruction object with respect to an area corresponding to the screen pad 201. If no movement is detected at step S32, the controller 110 continues monitoring for movement. Otherwise, if it is determined at step S32 that a touch position of an instruction object performing the touch operation is moving, the controller 110 at step S33 determines whether the movement is upward or downward.

If the controller 110 determines that the movement is upward at step S33, the controller 110 at step S34 determines a size at which an interface or an element within the interface is to be enlarged according to a moving distance corresponding to the detected movement. For example, if the pinch event is a result of a user moving his or her thumb substantially upwards within the screen pad 201, the size at which the interface or an element within the interface is enlarged in response to detecting the upward motion of the user's thumb may be proportional to the moving distance of the thumb detected during the touch operation. In this case, the moving distance is a length of the trace from an initial position of the touch operation to a final position of the touch operation.

Referring back to step S33, if the controller 110 at step S33 determines that the direction of the movement during the touch operation is substantially downward, the controller 110 at step S35 determines a size at which the interface or an element within the interface is to be reduced according to a calculated moving distance corresponding to the movement. Similar to the example above with respect to the upward movement, the controller 110 determines a moving distance based on an initial position of an instruction object performing the touch operation and a final position of the instruction object during the touch operation, whereby a length of the trace connecting the initial position and the final position corresponds to the moving distance. In response to determining the moving distance, the controller 110 may control the display 120 such that the interface or an element within the interface is reduced in size proportionally to the calculated moving distance.

Referring still to FIG. 4, at step S36, the controller 110 determines whether the instruction object performing the input operation has moved away from the operating surface of the touch panel. The determination at step S36 may correspond to a determination as to whether the electrostatic capacitance generated by the one or more touch sensors of the touch panel 130 has fallen below a predetermined threshold, which indicates that the instruction object is substantially away from the operating surface of the touch panel.

If the controller 110 determines at step S36 that the instruction object has not moved away from the operating surface of the screen, the process of FIG. 4 returns to the determination at step S32. Otherwise, the controller 110 at step S37 executes processing related to the pinch event. As mentioned previously, in one or more embodiments, the processing related to the pinch event may correspond to a reduction or expansion in size of an interface or an element within an interface displayed on the display 120. For example, the interface displayed in the display 120 in FIG. 1 may be reduced or enlarged proportionally to the moving distance calculated above for steps S34 and S35. In other embodiments, processing related to other display control or other device operations may be executed in response to detecting a pinch event.

In one or more embodiments, the controller 110 may control the display 120 such that the display outputs an indication of at least one of a magnitude and a direction in which the interface and/or an element included in the interface will change size in response to a pinch event according to the present disclosure. In other embodiments, such an indication of the change in magnitude and/or direction is not displayed in relation to a detected pinch event (or other event resulting in a change in size of an interface and/or an element within an interface).

Further, in one or more embodiments, the change in size of the interface and/or the element included in the interface may occur in real time. That is, the controller 110 may continuously control the display 120 in response to a movement corresponding to a pinch event such that the interface and/or the element included in the interface changes at substantially the same time in relation to the movement of the instruction object during the touch operation. For example, in one or more embodiments, the controller 110 may perform processing related to an enlargement/reduction in size of an interface without first determining whether the instruction object has moved away from the operating surface of the display.

Figure 5:
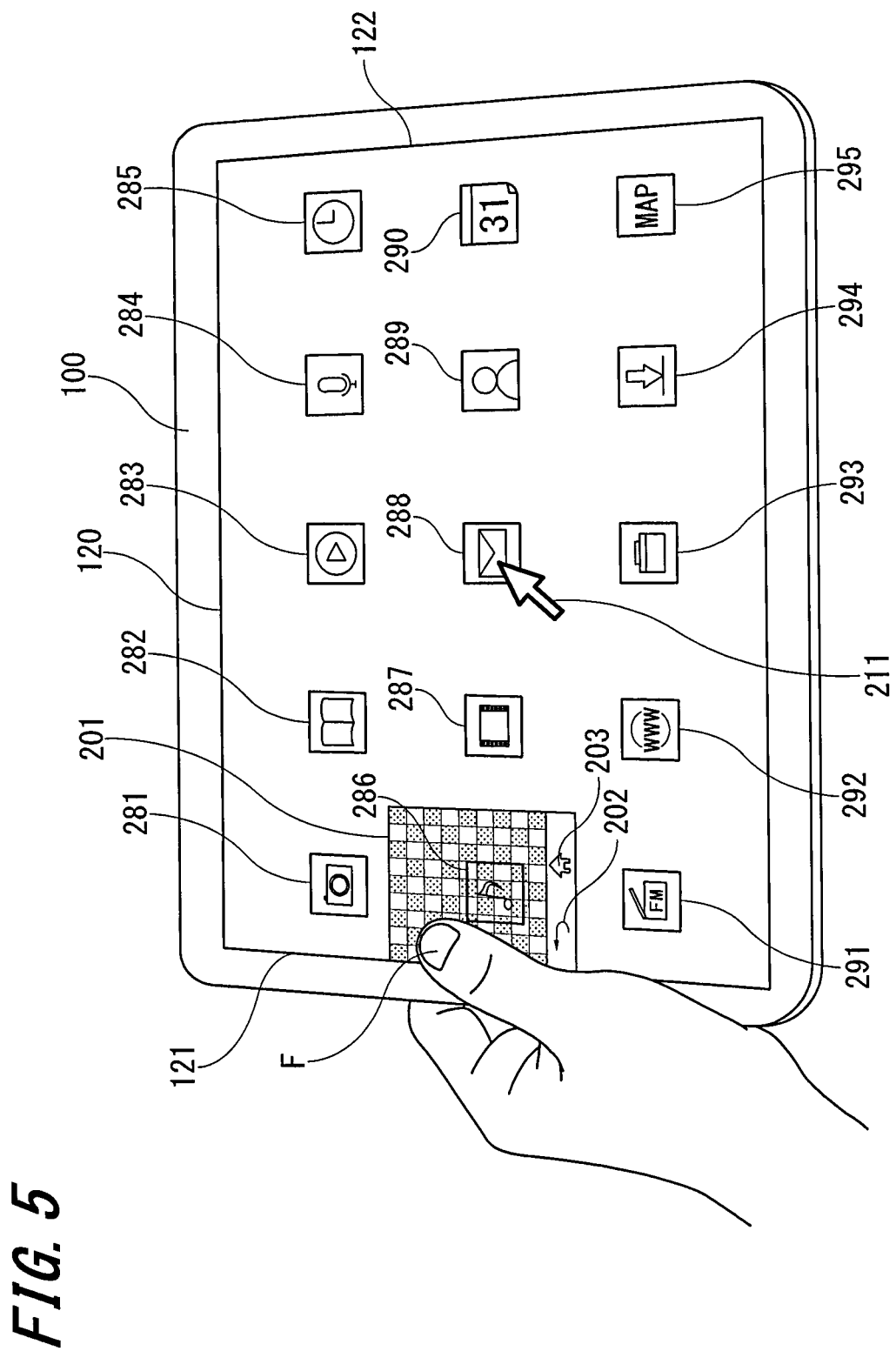
FIG. 5 illustrates a non-limiting example of a display interface that includes a screen pad for controlling a display panel, according to certain embodiments.

Next, FIG. 5 illustrates a non-limiting example of a display interface that includes a screen pad for controlling a display panel, according to certain embodiments.

The terminal device 100 in FIG. 5 is shown displaying an interface on the display 120 that includes icons 281 through 295. In this example, suppose that a user's finger F contacts an area of the display 120 corresponding to the left edge portion 121. In response to detecting a touch operation in an area corresponding to the left portion edge 121, the controller 110 controls the display 120 such that the screen pad 201 is displayed along the left edge portion 121 of the display 120. The screen pad 201 may, for example, be a square-shaped element that includes coloration or patterns indicating boundaries of the screen pad. In one or more embodiments, the screen pad 201 may be semi-transparent such that an icon or other interface element displayed on the display 120 may be visible through the screen pad 201. For example, the screen pad 201 in FIG. 5 is illustrated in a semi-transparent state such that the icon 286 is visible behind the screen pad 201.

In one or more embodiments, the screen pad 201 may include icons corresponding to control operations of the terminal device 100. For example, the screen pad 201 in FIG. 5 includes icons 202 and 203. The icon 202 in this example performs an operation corresponding to returning to a previous screen or previous interface, etc. The icon 203 in this example corresponds to an operation for returning to a home screen. The icons illustrated in this example are not limiting, and the screen pad 201 may be adapted such that other icons or no icons are displayed, or such that the operations related to the display icons are different than those explicitly described herein.

As shown in FIG. 5, when a user's finger F contacts an area corresponding to the screen pad 201 for a relatively short period of time, the controller 110 may perform an operation corresponding to a tap operation. In one or more embodiments, the tap operation may correspond to executing instructions associated with an icon that is overlapped by the pointer 211 at the time of the tap operation. For example, in response to detecting a tap operation when the pointer 211 is in the position shown in the example of FIG. 5, the controller 110 may execute an electronic mail application corresponding to the icon 288 since the pointer 211 is presently shown overlapping the icon 288. In one or more embodiments, a display position of the pointer 211 may be controlled in response to detecting a tap operation in an area corresponding to the screen pad 201. For example, display coordinates in the display 120 may be mapped to corresponding coordinates within the screen pad 201 such that when the user's finger F performs a tap operation within the screen pad 201, the displayed position of the pointer 211 "jumps" to the corresponding coordinate at which the tap operation was detected.

In one or more embodiments, icons or other interface elements that are being overlapped by the screen pad 201 may remain in a suppressed state while being overlapped by the screen pad. For example, the icon 286 is illustrated as being overlapped by the screen pad 201 in the example of FIG. 5. Accordingly, in response to detecting an operation in an area corresponding to the position of the icon 286, the controller 110 in this example does not execute the application corresponding to the icon 286. In one or more embodiments, the controller 110 may control a display 120 such that icons or other interface elements displayed in the display 120 may be moved within the display in response to displaying the screen pad 201. For example, in response to detecting an operation corresponding to the display of the screen pad 201, the controller 110 may control the display 120 such that an arrangement of the icons 281 through 295 within the interface is altered such that none of the icons are overlapped by the screen pad 201. In still further embodiments, the controller 110 may control the display 120 such that the screen pad 201 is displayed such that it does not overlap with any interface elements currently displayed on the screen. That is, the position at which the screen pad 201 is displayed may be based both on the position of the touch operation and the position of any display elements currently displayed on the display 120.

Figure 6:
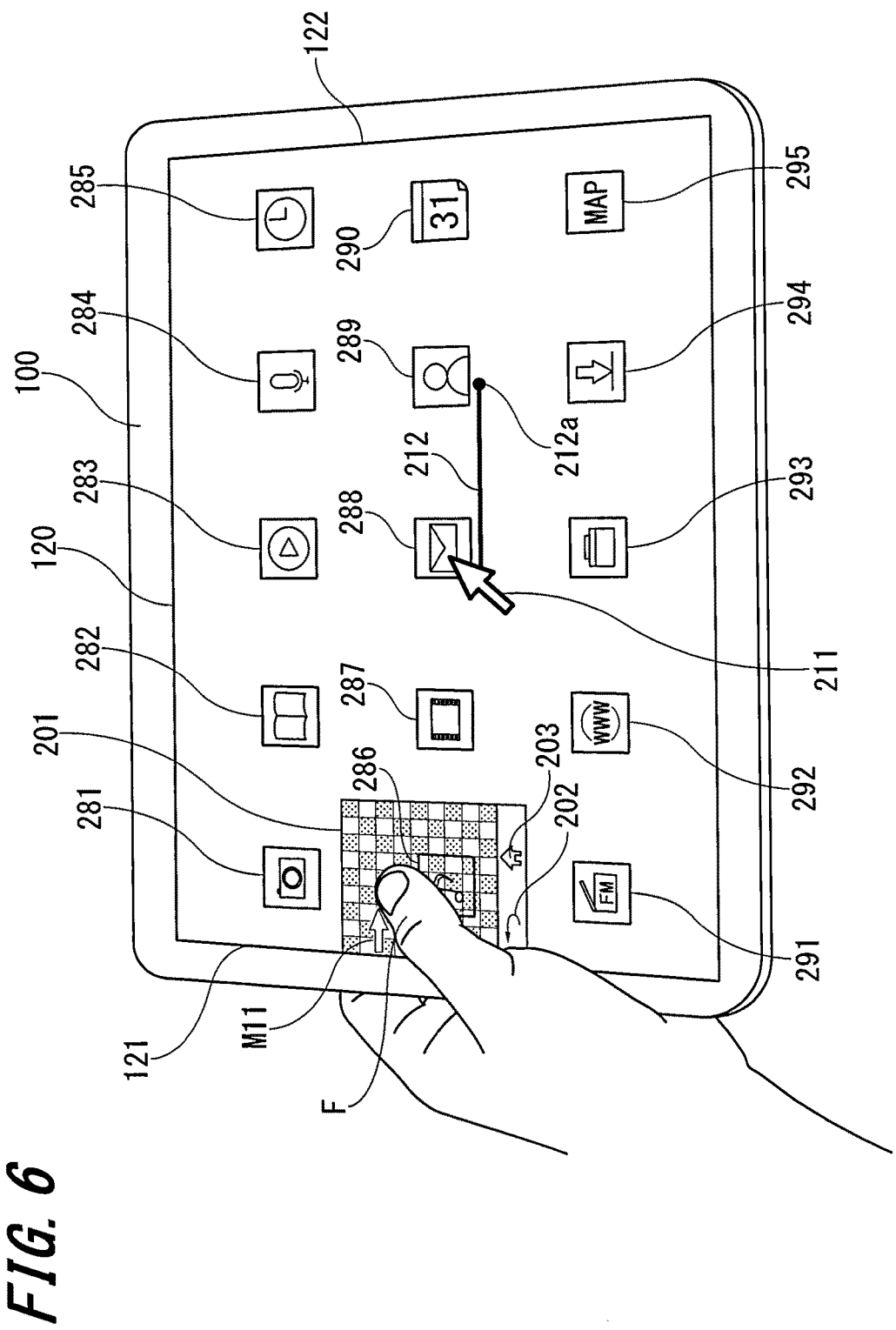
FIGS. 6 and 7 illustrate non-limiting examples of controlling a display panel based on a flick operation detected in a screen pad included in a display interface, according to certain embodiments.
Figure 7:
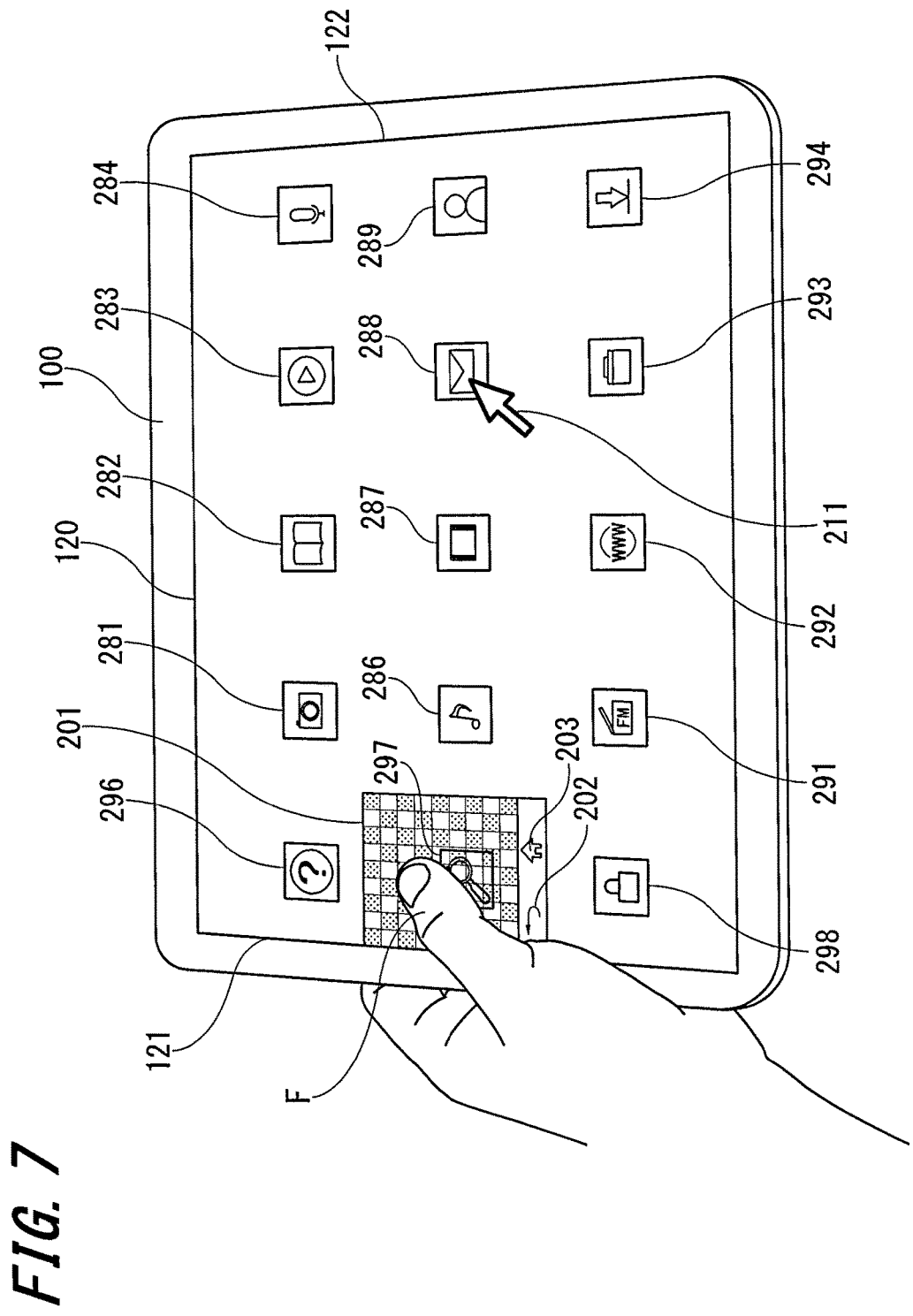

Next, FIGS. 6 and 7 illustrate non-limiting examples of controlling a display based on a flick operation detected in an area corresponding to a screen pad included in a display interface, according to certain embodiments.

Referring to FIG. 6, suppose that a user moves his or her finger F from a first position to a second position in a direction corresponding to arrow M1 within the screen pad 201. In one or more embodiments, the movement illustrated in FIG. 6 or the reciprocal movement back to the left within the screen pad 201 may correspond to a flick operation or flick event. In one or more embodiments, a time duration of the movement from the first position to the second position may be a distinguishing feature of the touch operation. For example, as described in FIG. 3, the controller 110 may determine that a flick event has occurred in response to detecting motion similar to the motion illustrated in FIG. 6 when the duration of the motion is less than a predetermined time t1.

In one or more embodiments, in response to detecting a flick operation (or another operation for controlling a display position of an interface or an element within an interface), the controller 110 may control the display such that a line 212 is displayed. The line 212 may indicate a direction and magnitude that an interface or an element within an interface is to be moved in response to the flick operation. For example, the line 212 in this example extends in a direction corresponding to the direction of the arrow M11. Additionally, the length of the line 212 may be proportional to the moving distance of the instruction object (finger F) when performing the flick operation. In the example shown in FIG. 6, the line 212 may be displayed on the display 120 such that the user has visual indication that the interface or an element within the interface will move by a distance corresponding to the length between the pointer 211 and the point 212a. Thus, following completion of the flick operation, the controller 110 controls the display 120 such that the interface or the element within the interface is moved in a direction and magnitude corresponding the line 212. In certain embodiments, the line 212 may not be included on the display 120, and the movement of the interface and/or the element within the interface in response to the flick operation may be performed in real time as the flick operation occurs, or shortly thereafter.

Moreover, it is noted that while the present example describes a movement of an interface or an element within an interface as corresponding to an operation performed in response to detecting a flick operation, the present disclosure is not limited to performing such an operation in response to a flick operation and instead, the movement of the interface and/or the element within the interface may be performed in response to detecting any arbitrary touch operation within an area corresponding to the screen pad 201. For example, correspondence information between any arbitrary touch operation and control processing for controlling a display position of an interface may be stored in the memory 150, and the controller 110 may execute the processing by analyzing features of a detected touch operation to determine whether the touch operation matches a corresponding operation.

Referring now to FIG. 7, FIG. 7 illustrates an exemplary result of display control processing performed in response to detecting a flick operation within an area corresponding to the screen pad 201. In this example, in response to the flick operation performed and described above with respect to FIG. 6, the interface displayed in the display 120 shifts rightward such that icons 296 through 298 are now displayed on the display 120, and the icons 284, 289, and 294 are shifted off of the displayed interface. Further, the icon 286 that was previously overlapped by the screen pad 201 is shifted to the right such that the icon 286 is no longer overlapped by the screen pad, but instead the icon 297 is being overlapped by the screen pad 201. In one or more embodiments, the pointer 211 may be shifted rightward by a distance corresponding to the distance at which the interface or the element(s) within the interface are shifted in response to the flick operation. In other embodiments, the pointer 211 may remain in the same position before and after the flick operation is performed.

As mentioned above, the magnitude and the shift of the display position of an interface or an element within an interface in response to detecting a flick operation may be proportional to the moving distance of the instruction object during the touch operation. For example, the display position of the icons displayed in the interface in FIG. 7 may be shifted in accordance with the magnitude of the moving direction of the instruction object during the flick operation (e.g. more icons may be shifted as the moving distance of the instruction object increases). In one or more embodiments, the velocity of the instruction object performing the flick operation may be calculated (e.g. the rate of change of a touch position of the user's finger F when performing the touch operation), and the change in display position of the interface and/or an element within the interface may be in proportion to the calculated velocity.

Figure 8:
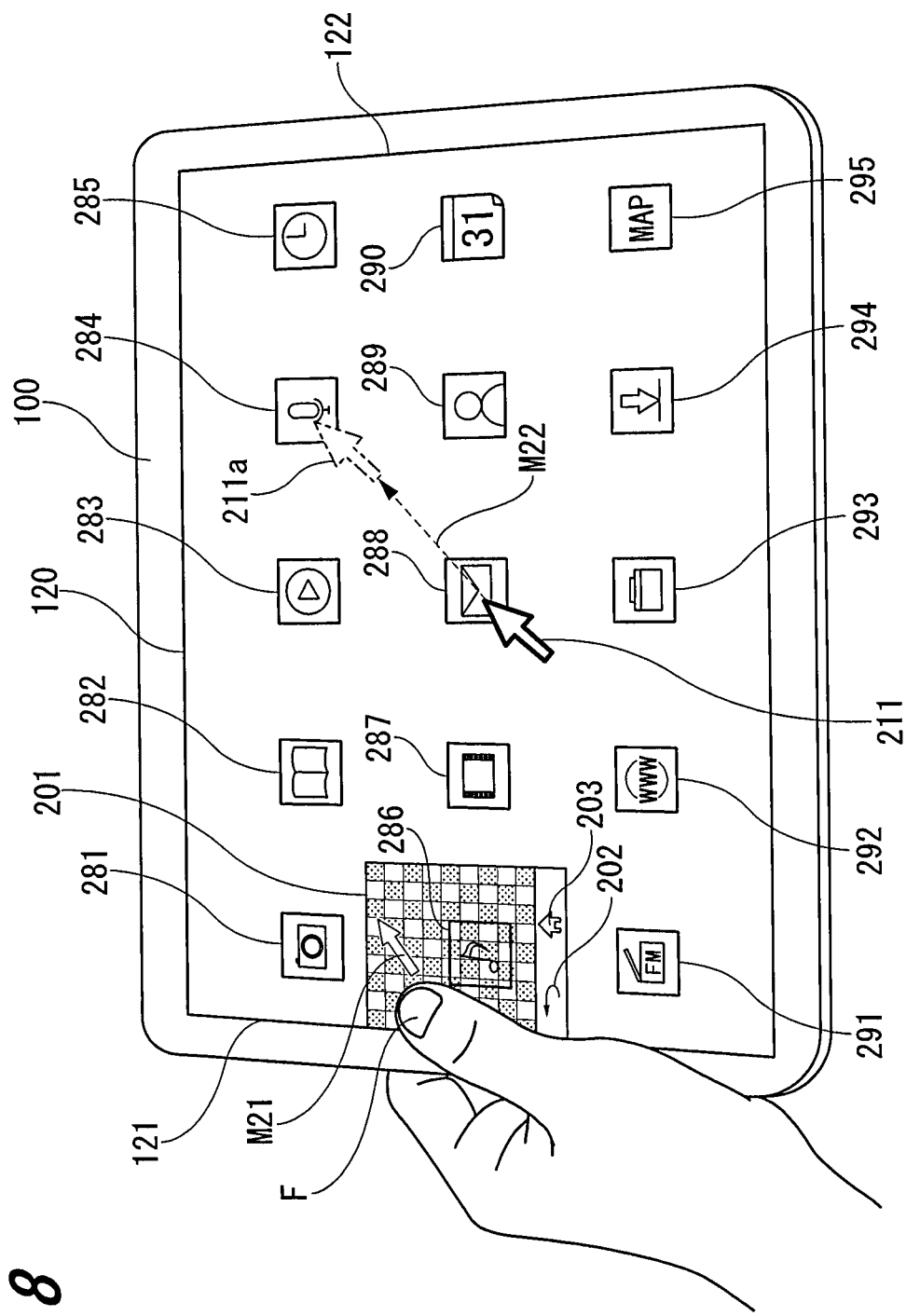
FIG. 8 illustrates a non-limiting example of controlling a displayed position of a pointer based on a touch operation detected within a screen pad included in a display interface, according to certain embodiments.

Next, FIG. 8 illustrates a non-limiting example of controlling a display position of a pointer based on a touch operation detected within an area corresponding to a screen pad included in a display interface, according to certain embodiments.

Referring to FIG. 8, suppose that the user's finger F in this example performs a touch operation within an area corresponding to the screen pad 201 in a direction corresponding to the arrow M21. Further, assume for the purposes of this example that the duration of the touch operation performed for FIG. 8 corresponds to a time duration for moving a display position of the pointer 211 (e.g. the duration of the touch operation is greater than time t2 but less than time t3, as in the example of FIG. 3). In response to detecting the touch operation illustrated in FIG. 8, the controller 110 may control the display 120 such that the display position of the pointer 211 is moved in a direction and magnitude corresponding to arrow M22. It is noted that the arrow M22 in FIG. 8 is provided merely for illustration purposes and this arrow is not necessarily displayed during the movement of the display position of the pointer 211. As discussed previously, the direction of the arrow M22 may correspond to the direction of motion of the user's finger F during the touch operation (i.e., the trace formed by finger F moving according to arrow M21). Further, the magnitude of change of the display position of the pointer 211 in response to the touch operation may be proportional to the moving distance of the instruction object during the touch operation (e.g., the length of the arrow M21). As a result of the touch operation performed in this example, the pointer 211 is displayed within the interface on the display 120 at a new position illustrated as position 211a. Accordingly, because the pointer 211 is now at a new position corresponding to position 211a, the user may now subsequently perform another touch operation within an area corresponding to the screen pad 201 (e.g. a tap operation) such that an operation associated with the icon 284 may be executed by the controller 110 in response to detecting the subsequent touch operation.

Figure 9:
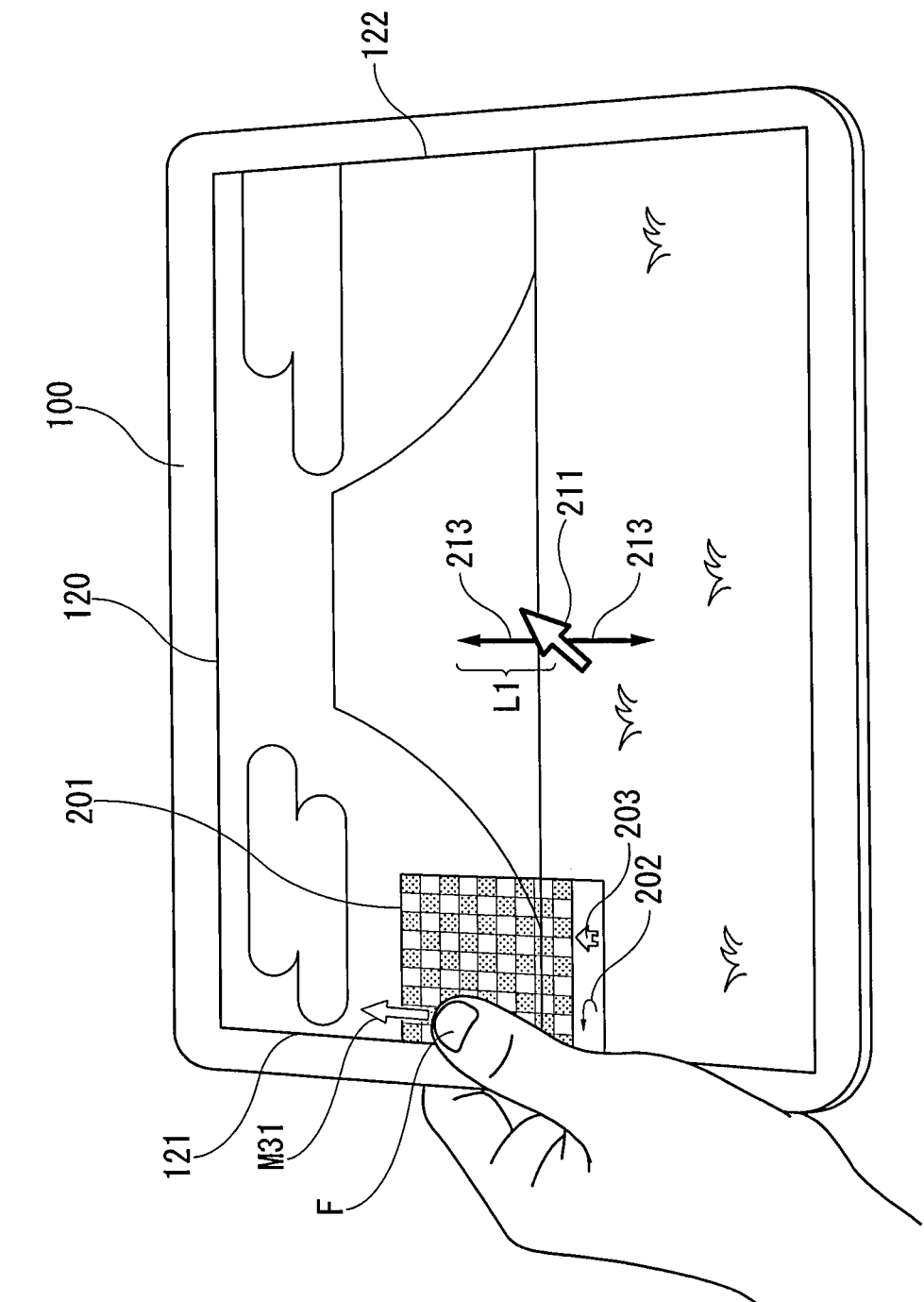
FIGS. 9 and 10 illustrate a non-limiting example of controlling a size of elements in a display interface or a size of the display interface based on a touch operation detected in a screen pad included in the display interface, according to certain embodiments.
Figure 10:
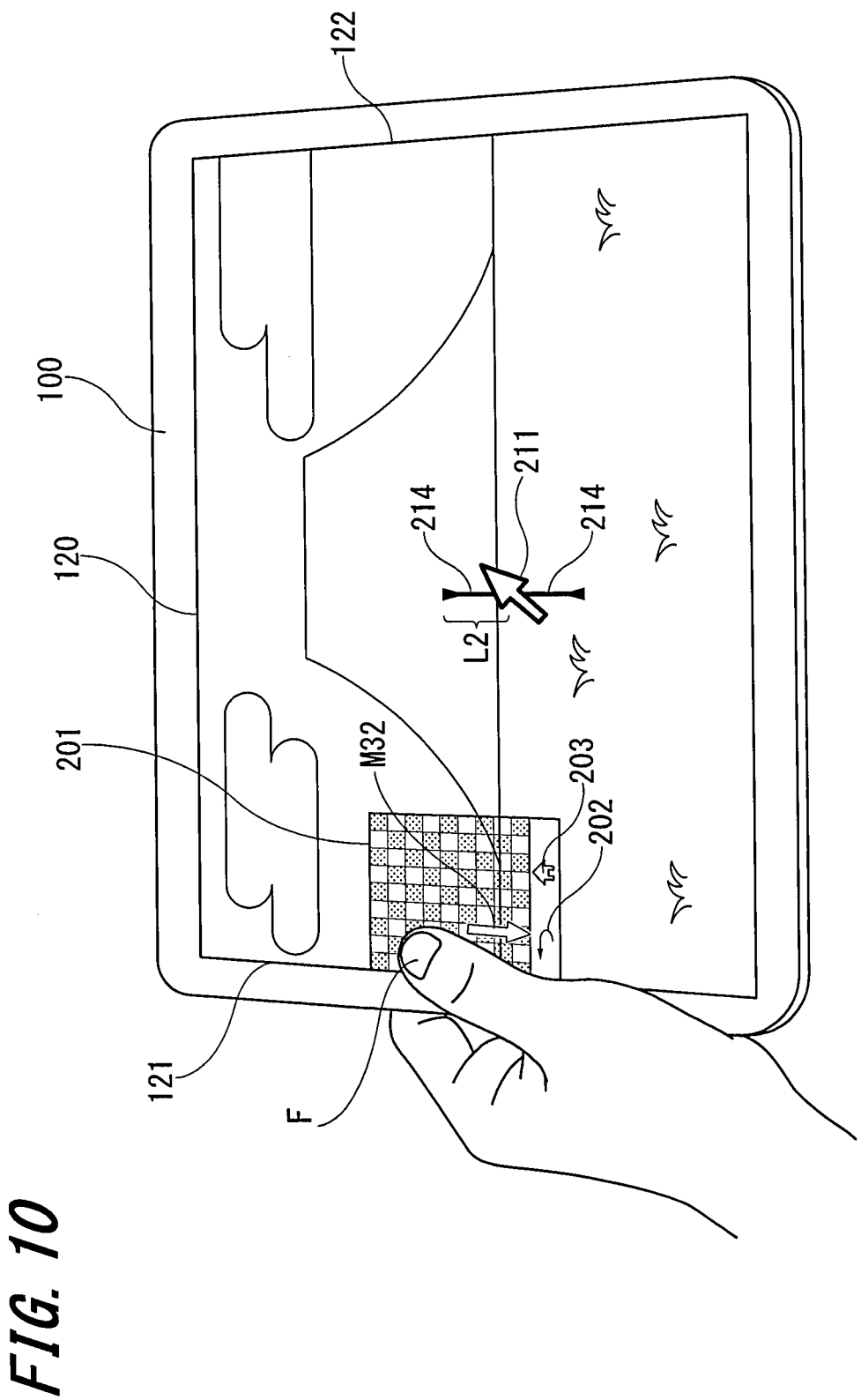

Next, FIGS. 9 and 10 illustrate a non-limiting example of controlling a size of elements in a display interface or a size of the display interface based on a touch operation detected in an area corresponding to a screen pad included in the display interface, according to certain embodiments.

Referring first to FIG. 9, FIG. 9 illustrates a non-limiting example of expanding a size of a display interface on the display 120 in response to a pinch operation (or another operation for expanding/reducing a size of an interface or element within an interface) performed in an area corresponding to the screen pad 201. In this example, assume that a user performs a touch operation within the screen pad 201 by moving the finger F upwards in a direction corresponding to the arrow M31. Further, assume that the touch operation shown in FIG. 9 is performed with a time duration corresponding to the predetermined time duration for a pinch operation (e.g. the time duration is greater than or equal to the predetermined time t3 as in FIG. 3). In response to detecting the touch operation performed in FIG. 9, the controller 110 controls the display 120 such that arrows 213 are displayed upward and downward with respect to the pointer 211. A length L1 of each of the respective arrows 213 may correspond to a moving distance of the finger F when performing the touch operation, which may be proportional to a magnitude at which the interface or interface element will be reduced/expanded in size as a result of the touch operation. Further, the direction of the arrows 213 may correspond to the direction of motion of the touch operation (i.e. the direction of arrow M31), which may correspond to the direction in which the interface or interface element will be reduced/expanded. That is, in one or more embodiments, a pinch operation performed in an upward direction corresponds to an expansion of an interface or an element within the interface displayed on the display 120. As a result of displaying the arrows 213 within the interface on the display 120, the user performing the touch operation has a visual indication as to the direction and the magnitude of the expansion of the interface or interface element that will result from the touch operation performed within the screen pad 201.

In one or more embodiments, the arrows 213 may not be displayed in response to the pinch operation, but rather the pinch operation and related display control may be performed substantially at the same time such that the display is expanded in size as the finger F is moving within the screen pad 201. Moreover, in the case in which the arrows 213 or another equivalent indication are included in the display interface in response to the pinch operation, the indication may be displayed at a position other than the position shown in FIG. 9. Moreover, other touch operations may be determined in advance to correspond to an expansion or reduction in size of a display interface or an element within the interface. For example, correspondence information may be stored in advance in the memory 150 such that features of a detected touch operation performed within an area corresponding to the screen pad 201 may be analyzed, and a comparison between the features and the correspondences stored in the memory 150 may be performed such that a corresponding operation is executed as a result of a detected touch operation. Additionally, following the expansion of the display interface in FIG. 9, the arrows 213 may be suppressed.

Referring now to FIG. 10, FIG. 10 illustrates a non-limiting example of reducing a display size of an interface or an element within an interface in response to detecting a pinch operation performed in an area corresponding to the screen pad 201. In this example, assume that the user performs a touch operation within the screen pad 201 by moving his or her finger F in a downward direction corresponding to the arrow M32. Further, assume that the duration of the touch operation in FIG. 10 corresponds to a time duration for a pinch operation, similar to the above case for FIG. 9. In response to detecting the touch operation as shown in FIG. 10, the controller 110 may control the display 120 such that arrows 214 are displayed within the interface. In contrast to the example of FIG. 9, the direction of the tips of the arrows 214 in the example of FIG. 10 has changed such that the arrows are pointed inward, indicating that the interface or the element within the interface will be reduced in size in response to the pinch operation. Further, as in the example of FIG. 9, the arrows 214 have a length 212 corresponding to the moving distance of the finger F during the touch operation (i.e. the length of the arrow M32). The lengths of the arrows 214 may be proportional to the moving distance, and the length L2 provides a visual indication of the magnitude at which the interface or the element within the interface will change in response to the pinch operation. As was the case for the example in FIG. 9, when the user lifts his or her finger F from the surface of the display 120 after performing the touch operation, the interface displayed in the display 120 may be reduced in size by a magnitude corresponding to the length L2 in a direction corresponding to the arrows 214. Following the reduction in size of the interface, the arrows 214 may be suppressed. Exemplary modifications discussed above with respect to certain embodiments and with respect to FIG. 9 also apply for the example of FIG. 10.

Figure 11:
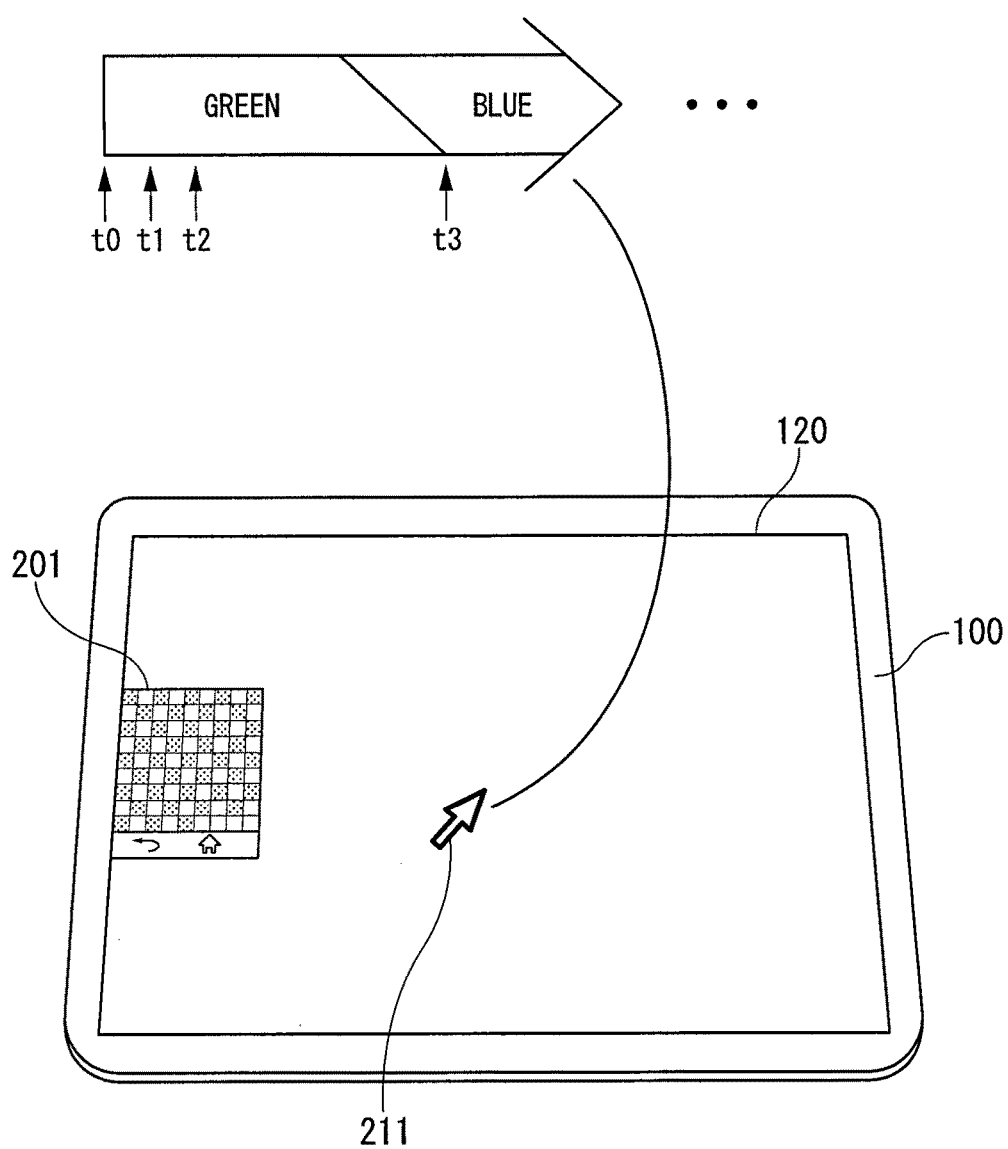
FIG. 11 illustrates a non-limiting example of varying features of a displayed pointer based on features of a touch operation detected in a screen pad included in a display interface, according to certain embodiments.

Next, FIG. 11 illustrates a non-limiting example of varying features of a displayed pointer based on features of a touch operation detected in an area corresponding to a screen pad included in a display interface, according to certain embodiments. In particular, the example of FIG. 11 illustrates an example of changing a color of the display pointer 211 based on a time duration of the touch operation performed in an area corresponding to the screen pad 201.

Referring now to FIG. 11, the pointer 211 in this example varies in color based on a time duration with respect to an initial time at which the touch operation within the screen pad 201 begins. For example, the initial coloration of the pointer 211 following the initial time t0 at which the touch operation begins may be green. As the time duration of the touch operation increases, the coloration of the pointer 211 may gradually change from solid green to solid blue. As shown at the top portion of FIG. 11, the pointer 211 may initially be solid green at time t0, gradually shift to a varied shade of greenish blue at times t1 and t2, and eventually change to a solid blue color at time t3. The change in coloration or other features with respect to the pointer 211 may be performed in conjunction with other display control processing such as the processing illustrated and described above with respect to FIG. 3. For example, when the controller 110 may determines an operation to be performed based on the time duration of the touch operation, the color of the pointer 211 may also change such that the user has a visual indication of which operation will be performed as a result of a given touch operation. For example, the color of the pointer 211 shown on the display 120 may indicate which of a pinch operation or an operation for moving the pointer 211 will be performed as a result of the touch operation that is currently in progress. That is, the color of the pointer 211 may indicate when the time duration T of the touch operation has, for example, increased above the predetermined time t3 from FIG. 3.

In one or more embodiments, features other than the coloration of the pointer 211 may be varied based on the time duration of a touch operation. For example, an orientation or a size of the pointer 211 may be varied based on the time duration of the touch operation. Moreover, other indications of the time duration of the current touch operation may be output on the display 120 such that the user has a visual indication as to which of a plurality of touch operations and corresponding display control operations is performed.

Figure 12:
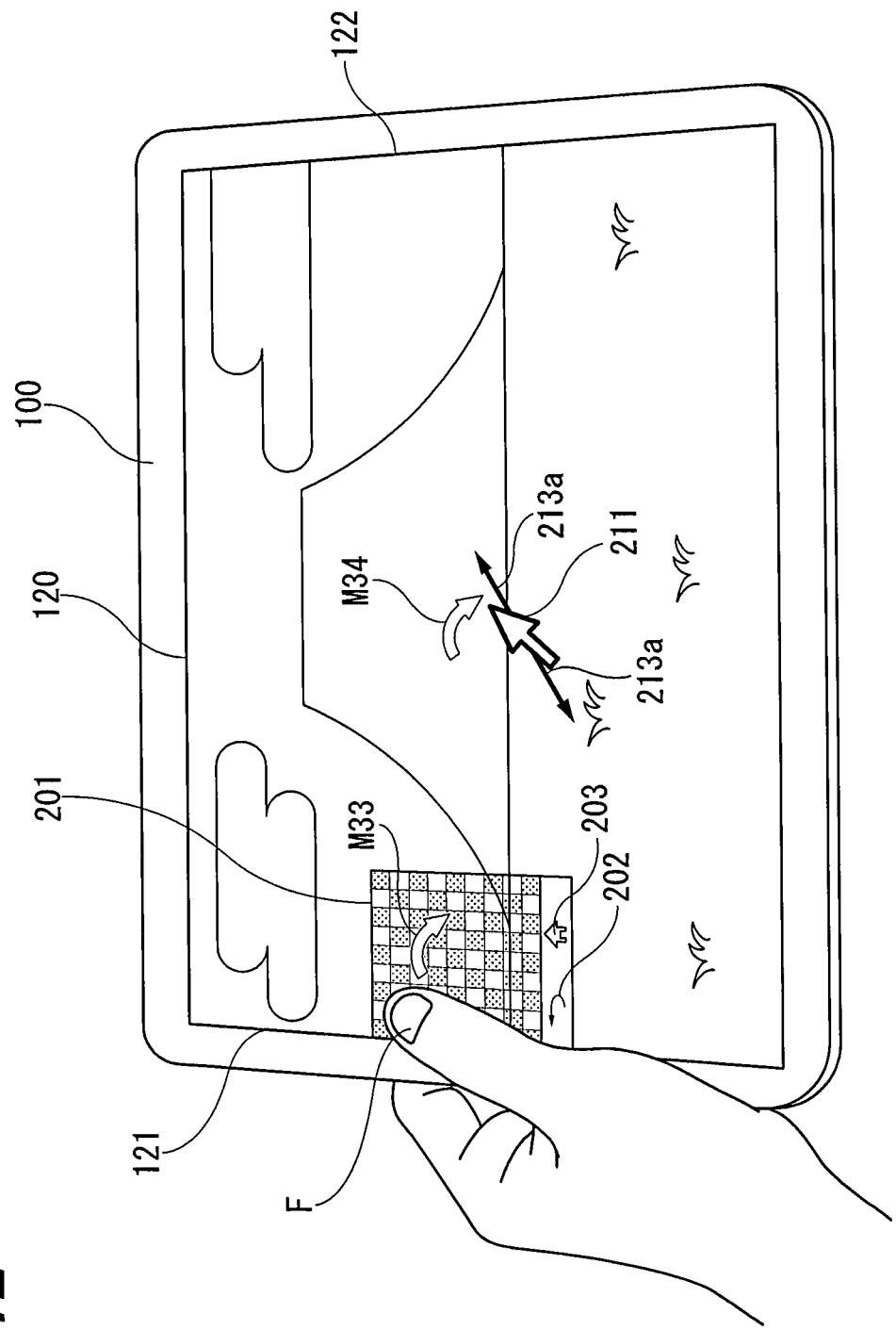
FIG. 12 illustrates a non-limiting example of rotating elements of a display interface or rotating the display interface based on a touch operation detected in a screen pad included in the display interface, according to certain embodiments.

Next, FIG. 12 illustrates a non-limiting example of rotating elements of a display interface or rotating the display interface based on a touch operation detected in an area corresponding to a screen pad included in the interface, according to certain embodiments.

Referring to FIG. 12, in contrast to the touch operation performed above at least with respect to FIG. 9, the touch operation in FIG. 12 is performed with the user's finger F moving rightward in a substantially arcing or circular motion, as indicated by arrow M33. Based on the features of the touch operation performed in this example (e.g., the degree of curvature), the controller 110 may determine that the touch operation performed within the screen pad 201 corresponds to an operation for rotating an interface or an element within the interface displayed on display 120. Further, in certain embodiments, in response to determining that the operation for rotating the interface and/or the element within the interface is performed in response to detecting the touch operation in FIG. 12, the controller 110 may control the display 120 such that arrows 213a are included in the interface. The arrows 213a may indicate a direction and magnitude that the interface or the element within the interface will be rotated. For example, the arrows 213a illustrated in FIG. 12 are offset from a horizontal axis corresponding to a lengthwise edge of the terminal device 100, which may indicate that the display interface on the display 120 will be rotated proportionally to the offset of the arrows 213a with respect to the horizontal axis.

Further, in one or more embodiments, the touch operation illustrated in FIG. 12 may, in addition to rotating the interface or the element within the interface, concurrently expand or reduce the size of the interface or the element within the interface, similar to the example in FIG. 9. Accordingly, the length of the arrows 213a may be proportional to the moving distance of the user's finger F during the touch operation (i.e. the length of arrow M33), which provides visual indication of the magnitude at which the interface in the display 120 will be expanded as a result of the touch operation. The interface or the element within the interface may also be reduced in size while concurrently rotating the interface or the element within the interface, similar to the example shown in FIG. 10.

Obviously, numerous modifications and variations of the present disclosure are possible in light of the above teachings. It is therefore to be understood that within the scope of the appended claims, the present disclosure may be practiced otherwise than as specifically described herein. For example, advantageous results may be achieved if the steps of the disclosed techniques were performed in a different sequence, if components in the disclosed systems were combined in a different manner, or if the components were replaced or supplemented by other components.

For example, in one or more embodiments, a screen pad and/or pointer may be displayed within an interface in response to detecting a touch operation in any arbitrary area of a display panel.

Moreover, in one or more embodiments, the screen pad and/or pointer may be displayed differently than the examples explicitly described herein (e.g., the elements may vary in shape, size, color, etc., or a completely different object may be used as a pointer or other element).

Moreover, any arbitrary touch operation may cause processing described herein to be performed, and the present disclosure is not limited to performing processing in response to detecting a particular touch operation (e.g., flick, tap, pinch, etc.) or a particular correspondence to a touch operation.

Moreover, the processing described herein may be adapted to be performed based on a number of contact points detected during a touch operation (e.g., a number of fingers performing the touch operation).

Moreover, in one or more embodiments, a combination of touch operations may be performed such that the control circuitry included in a device selects an icon (or other element) and moves the icon to a different location within the interface (similar to a drag-and-drop operation). For example, a tap operation may cause a controller to control a display panel to indicate that an icon overlapped by a displayed pointer has been "selected," and a subsequent touch operation in the screen pad may cause the controller to control the display panel such that the icon is moved in relation to a trace corresponding to the movement of the instruction object during the touch operation.

The functions, processes and algorithms described herein may be performed in hardware or software executed by hardware, including computer processors and/or programmable processing circuits configured to execute program code and/or computer instructions to execute the functions, processes and algorithms described herein. A processing circuit includes a programmed processor, as a processor includes circuitry. A processing circuit also includes devices such as an application specific integrated circuit (ASIC) and conventional circuit components arranged to perform the recited functions.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process. Additionally, some implementations may be performed on modules or hardware not identical to those described. Accordingly, other implementations are within the scope that may be claimed.

It must be noted that, as used in the specification and the appended claims, the singular forms "a," "an," and "the" include plural referents unless the context clearly dictates otherwise.

The above disclosure also encompasses the embodiments noted below.

(1) A device comprising circuitry configured to: receive a first input from one or more touch sensors included in a display panel; determine, based on the first input from the one or more touch sensors, whether a first touch operation is performed within a predetermined portion of the display panel; control, when it is determined that the first touch operation was performed within the predetermined portion of the display panel, the display panel to display a screen pad and a pointer within an interface on the display panel; determine, based on a second input received from the one or more touch sensors, whether a second touch operation is performed within a portion of the display panel corresponding to the displayed screen pad; and control, when the second touch operation is performed within the screen pad and based on features of the second touch operation, at least one of a movement of the pointer and an operation of the device.

(2) The device of (1), wherein the circuitry is configured to control the at least one of the movement of the pointer and the operation of the device based on a direction of the second touch operation.

(3) The device of (1) or (2), wherein the circuitry is configured to control the at least one of the movement of the pointer and the operation of the device based on a moving distance of the second touch operation.

(4) The device of any one of (1) to (3), wherein the circuitry is configured to control the at least one of the movement of the pointer and the operation of the device based on a time duration of the second touch operation.

(5) The device of any one of (1) to (4), wherein the circuitry is configured to control the display panel such that a color of the pointer changes based on the time duration of the second touch operation.

(6) The device of any one of (1) to (5), wherein the circuitry is configured to control the display panel such that the color of the pointer gradually changes from a first color to a second color as the time duration of the second touch operation increases.

(7) The device of any one of (1) to (6), wherein the circuitry is configured to control the display panel such that the screen pad and the pointer are displayed until a subsequent touch operation is detected in a portion of the display panel that does not corresponded to the displayed screen pad.

(8) The device of any one of (1) to (7), wherein the predetermined portion of the display panel is an edge portion of the display panel.

(9) The device of any one of (1) to (8), wherein the circuitry is configured to control the display panel such that the screen pad is displayed within a predetermined distance from the edge portion of the display panel.

(10) The device of any one of (1) to (9), wherein the circuitry is configured to control the display panel such that the screen pad is displayed within the interface at a position corresponding to a position on the display panel at which the first touch operation is performed.

(11) The device of any one of (1) to (10), wherein the circuitry is configured to control the display panel such that a size of the interface or a size of an element included in the interface is changed based on the features of the second touch operation.

(12) The device of any one of (1) to (11), wherein the circuitry is configured to control the display panel such that the size of the interface or the size of the element included in the interface is changed when the features of the second touch operation indicate that the second touch operation is a pinch operation.

(13) The device of any one of (1) to (12), wherein the circuitry is configured to control the display panel such that the size of the interface or the size of the element included in the interface is changed in proportion to a moving distance and a direction of the pinch operation.

(14) The device of any one of (1) to (13), wherein the circuitry is configured to control the display panel such that, when the features of the second touch operation indicate that the second touch operation begins at a first position and ends at a second position that is different than the first position, a length of the movement of the pointer is in proportion to a distance between the first position and the second position.

(15) The device of any one of (1) to (14), wherein: the circuitry is configured to detect the first and second touch operations by detecting one or more of a position and a direction of an instruction object that performs the first and second touch operations; and the circuitry is configured to control the display panel such that, when the features of the second touch operation indicate that the instruction object performing the second touch operation begins at a first position and ends at a second position that is different than the first position, a display position of the pointer changes in relation to a change in detected position of the instruction object during the second touch operation.

(16) The device of any one of (1) to (15), further comprising a memory that stores a correspondence between one or more touch operations and one or more predetermined operations performed in response to detecting a corresponding touch operation.

(17) The device of any one of (1) to (16), wherein the circuitry is configured to: determine, based on the features of the second touch operation, whether the second touch operation corresponds to a control operation, of the one or more predetermined operations, that causes an change in size of the interface or an element included in the interface; and control the display panel such that, when the second touch operation corresponds to the control operation, the display panel outputs an indication of at least one of a direction and magnitude of the change in the size.

(18) The device of any one of (1) to (17), wherein the circuitry is configured to: determine, based on the features of the second touch operation, whether the second touch operation corresponds to a control operation, of the one or more predetermined operations, that causes an change in display position of the interface or an element included in the interface; and control the display panel such that, when the second touch operation corresponds to the control operation, the display panel outputs an indication of at least one of a direction and magnitude of the change in the display position.

(19) A method comprising: receiving, by circuitry, a first input from one or more touch sensors included in a display panel; determining, by the circuitry, based on the first input from the one or more touch sensors, whether a first touch operation is performed within a predetermined portion of the display panel; controlling, by the circuitry, when it is determined that the first touch operation was performed within the predetermined portion of the display panel, the display panel to display a screen pad and a pointer within an interface on the display panel; determining, by the circuitry, based on a second input received from the one or more touch sensors, whether a second touch operation is performed within a portion of the display panel corresponding to the displayed screen pad; and controlling, by the circuitry, when the second touch operation is performed within the screen pad and based on features of the second touch operation, at least one of a movement of the pointer and an operation of a device in communication with the circuitry.

(20) A non-transitory computer readable medium having instructions stored therein that when executed by one or more processors cause a device including a display panel with one or more touch sensors to perform a method comprising: receiving a first input from the one or more touch sensors; determining, based on the first input from the one or more touch sensors, whether a first touch operation is performed within a predetermined portion of the display panel; controlling, when it is determined that the first touch operation was performed within the predetermined portion of the display panel, the display panel to display a screen pad and a pointer within an interface on the display panel; determining, based on a second input received from the one or more touch sensors, whether a second touch operation is performed within a portion of the display panel corresponding to the displayed screen pad; and controlling, when the second touch operation is performed within the screen pad and based on features of the second touch operation, at least one of a movement of the pointer and an operation of the device.

The invention claimed is:

1. A device comprising
circuitry configured to:
    receive a first input from one or more touch sensors included in a display panel;
    determine, based on the first input from the one or more touch sensors, whether a first touch operation is performed within a predetermined distance from an edge portion of the display panel at which no icon is displayed;
    control, only when it is determined that the first touch operation was performed within the predetermined distance from the edge portion of the display panel, the display panel to initiate simultaneous display of a screen pad and a pointer within an interface on the display panel such that the screen pad is displayed at a position on the display panel at which the first touch operation is performed;
    determine, based on a second input received from the one or more touch sensors, whether a second touch operation is performed within a portion of the display panel corresponding to the displayed screen pad;
    control, when the second touch operation is performed within the screen pad and based on features of the second touch operation, at least one of a movement of the pointer and an operation of the device; and
    control the display panel such that the screen pad and the pointer are displayed until a subsequent touch operation is detected in a portion of the display panel that does not correspond to the displayed screen pad and such that the screen pad and the pointer are thereafter caused to disappear from the interface on the display panel.

2. The device of claim 1, wherein
the circuitry is configured to control the at least one of the movement of the pointer and the operation of the device based on a direction of the second touch operation.

3. The device of claim 1, wherein
the circuitry is configured to control the at least one of the movement of the pointer and the operation of the device based on a moving distance of the second touch operation.

4. The device of claim 1, wherein
the circuitry is configured to control the at least one of the movement of the pointer and the operation of the device based on a time duration of the second touch operation.

5. The device of claim 4, wherein
the circuitry is configured to control the display panel such that a color of the pointer changes based on the time duration of the second touch operation.

6. The device of claim 5, wherein
the circuitry is configured to control the display panel such that the color of the pointer gradually changes from a first color to a second color as the time duration of the second touch operation increases.

7. The device of claim 1, wherein
the circuitry is configured to control the display panel such that a size of the interface or a size of an element included in the interface is changed based on the features of the second touch operation.

8. The device of claim 7, wherein
the circuitry is configured to control the display panel such that the size of the interface or the size of the element included in the interface is changed when the features of the second touch operation indicate that the second touch operation is a pinch operation.

9. The device of claim 8, wherein
the circuitry is configured to control the display panel such that the size of the interface or the size of the element included in the interface is changed in proportion to a moving distance and a direction of the pinch operation.

10. The device of claim 1, wherein
the circuitry is configured to control the display panel such that, when the features of the second touch operation indicate that the second touch operation begins at a first position and ends at a second position that is different than the first position, a length of the movement of the pointer is in proportion to a distance between the first position and the second position.

11. The device of claim 1, wherein:
the circuitry is configured to detect the first and second touch operations by detecting one or more of a position and a direction of an instruction object that performs the first and second touch operations; and
the circuitry is configured to control the display panel such that, when the features of the second touch operation indicate that the instruction object performing the second touch operation begins at a first position and ends at a second position that is different than the first position, a display position of the pointer changes in relation to a change in detected position of the instruction object during the second touch operation.

12. The device of claim 1, further comprising
a memory that stores a correspondence between one or more touch operations and one or more predetermined operations performed in response to detecting a corresponding touch operation.

13. The device of claim 12, wherein
the circuitry is configured to:
    determine, based on the features of the second touch operation, whether the second touch operation corresponds to a control operation, of the one or more predetermined operations, that causes an change in size of the interface or an element included in the interface; and
    control the display panel such that, when the second touch operation corresponds to the control operation, the display panel outputs an indication of at least one of a direction and magnitude of the change in the size.

14. The device of claim 12, wherein
the circuitry is configured to:
    determine, based on the features of the second touch operation, whether the second touch operation corresponds to a control operation, of the one or more predetermined operations, that causes an change in display position of the interface or an element included in the interface; and
    control the display panel such that, when the second touch operation corresponds to the control operation, the display panel outputs an indication of at least one of a direction and magnitude of the change in the display position.

15. A method comprising:
receiving, by circuitry, a first input from one or more touch sensors included in a display panel;
determining, by the circuitry, based on the first input from the one or more touch sensors, whether a first touch operation is performed within a predetermined distance from an edge portion of the display panel at which not icon is displayed;
controlling, by the circuitry, only when it is determined that the first touch operation was performed within the predetermined distance from the edge portion of the display panel, the display panel to initiate simultaneous display of a screen pad and a pointer within an interface on the display panel such that the screen pad is displayed at a position on the display panel at which the first touch operation is performed;
determining, by the circuitry, based on a second input received from the one or more touch sensors, whether a second touch operation is performed within a portion of the display panel corresponding to the displayed screen pad;
controlling, by the circuitry, when the second touch operation is performed within the screen pad and based on features of the second touch operation, at least one of a movement of the pointer and an operation of a device in communication with the circuitry; and
controlling, by the circuitry, the display panel such that the screen pad and the pointer are displayed until a subsequent touch operation is detected in a portion of the display panel that does not correspond to the displayed screen pad at which point the screen pad and the pointer disappear.

16. A device comprising
circuitry configured to:
    receive a first input from one or more touch sensors included in a display panel;
    determine, based on the first input from the one or more touch sensors, whether a first touch operation is performed within a predetermined distance from an edge portion of the display panel at which no icons are displayed;
    control, when it is determined that the first touch operation was performed within the predetermined distance of the edge portion of the display panel, the display panel to initiate simultaneous display of a screen pad and a pointer within an interface on the display panel such that the screen pad is displayed at a position on the display panel at which the first touch operation was performed;
    determine, based on a second input received from the one or more touch sensors, whether a second touch operation is performed within a portion of the display panel corresponding to the displayed screen pad;
    control, when the second touch operation is performed within the screen pad and based on features of the second touch operation, at least one of a movement of the pointer and an operation of the device; and
    control the display panel such that the screen pad and the pointer are displayed until a subsequent touch operation is detected in a portion of the display panel that does not correspond to the displayed screen pad at which point the screen pad and the pointer disappear.

* * * * *